May 22, 1934.  A. R. LAFFERTY ET AL  1,959,867
AUTOMATIC MICROMETER
Filed March 14, 1930  13 Sheets-Sheet 3

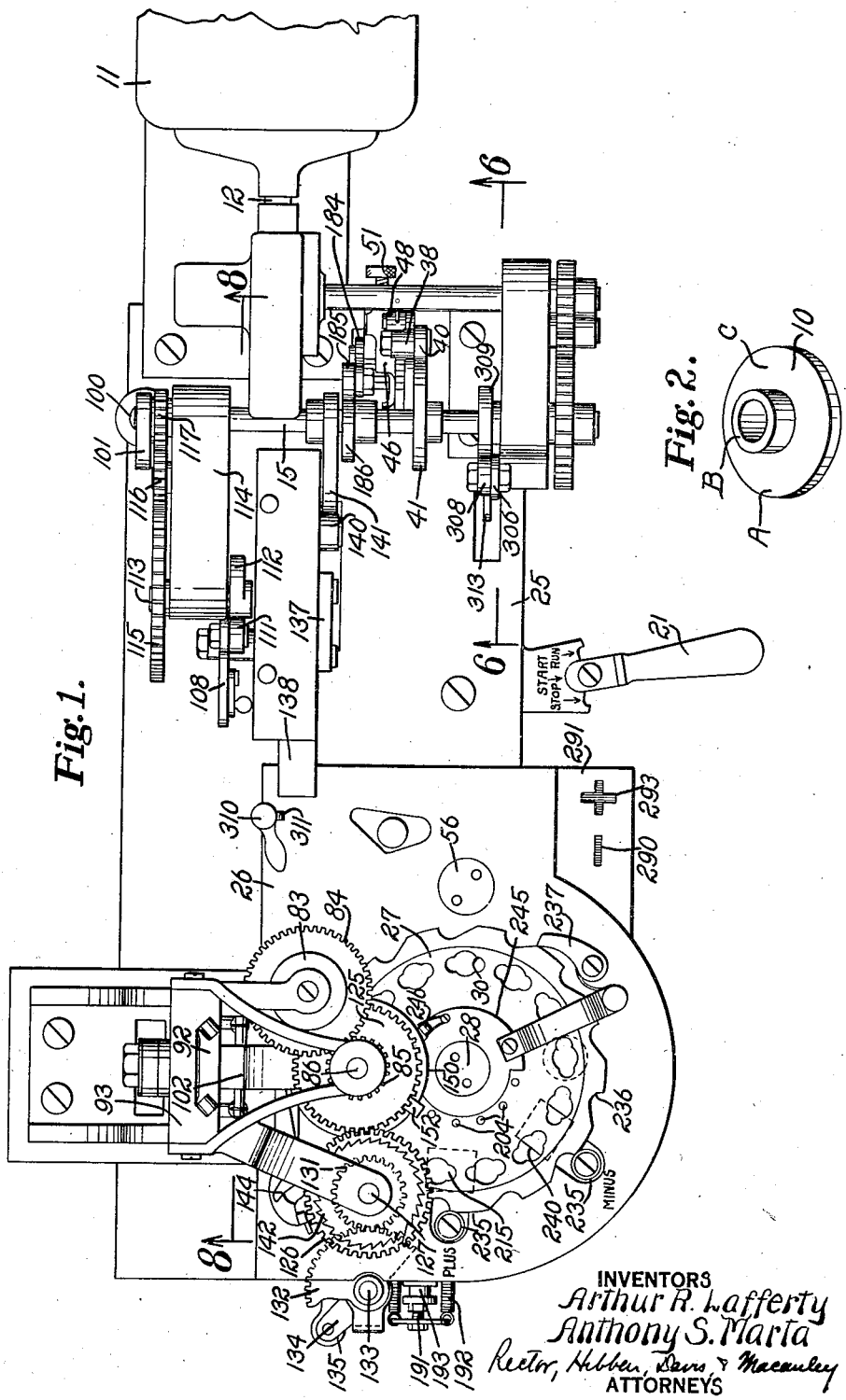

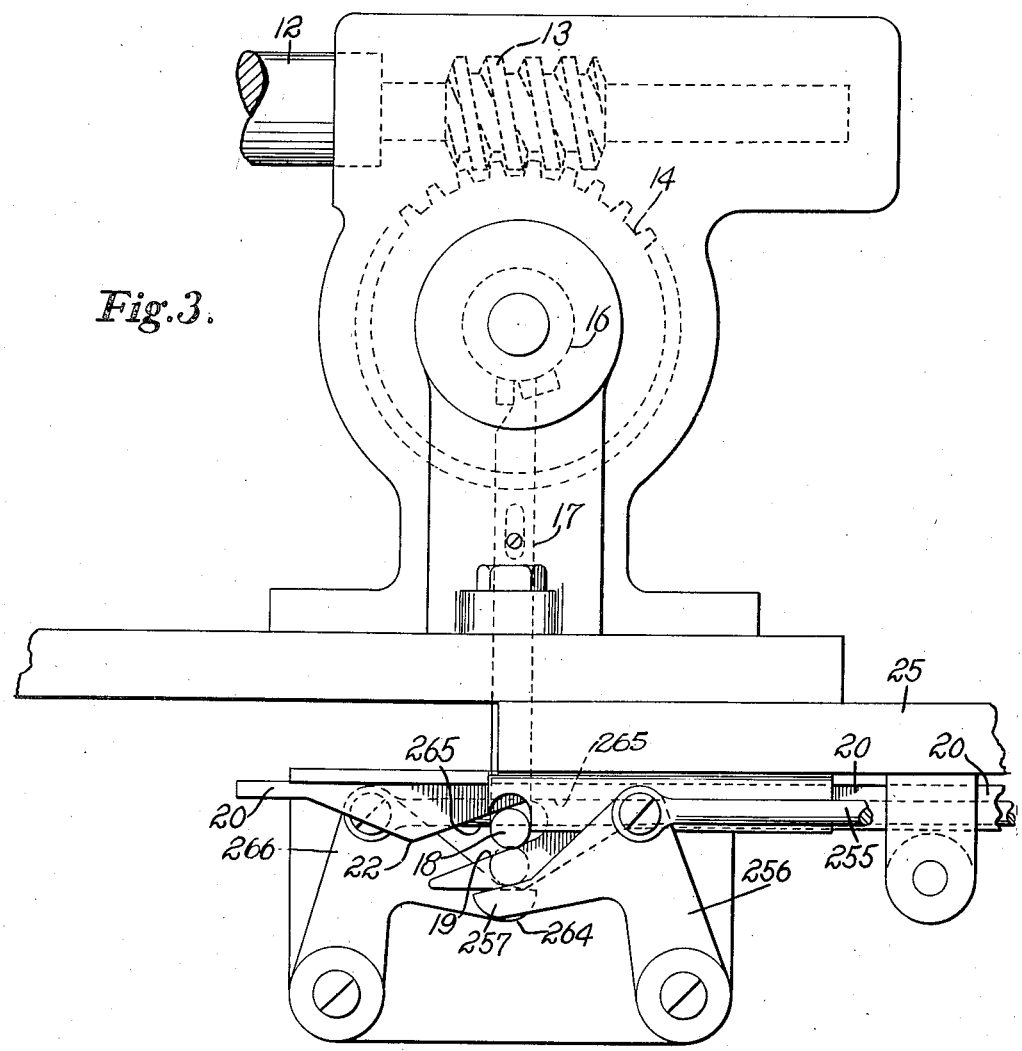

INVENTORS
Arthur R. Lafferty
Anthony S. Marta
Rector, Hibben, Davis, & Macauley
ATTORNEYS

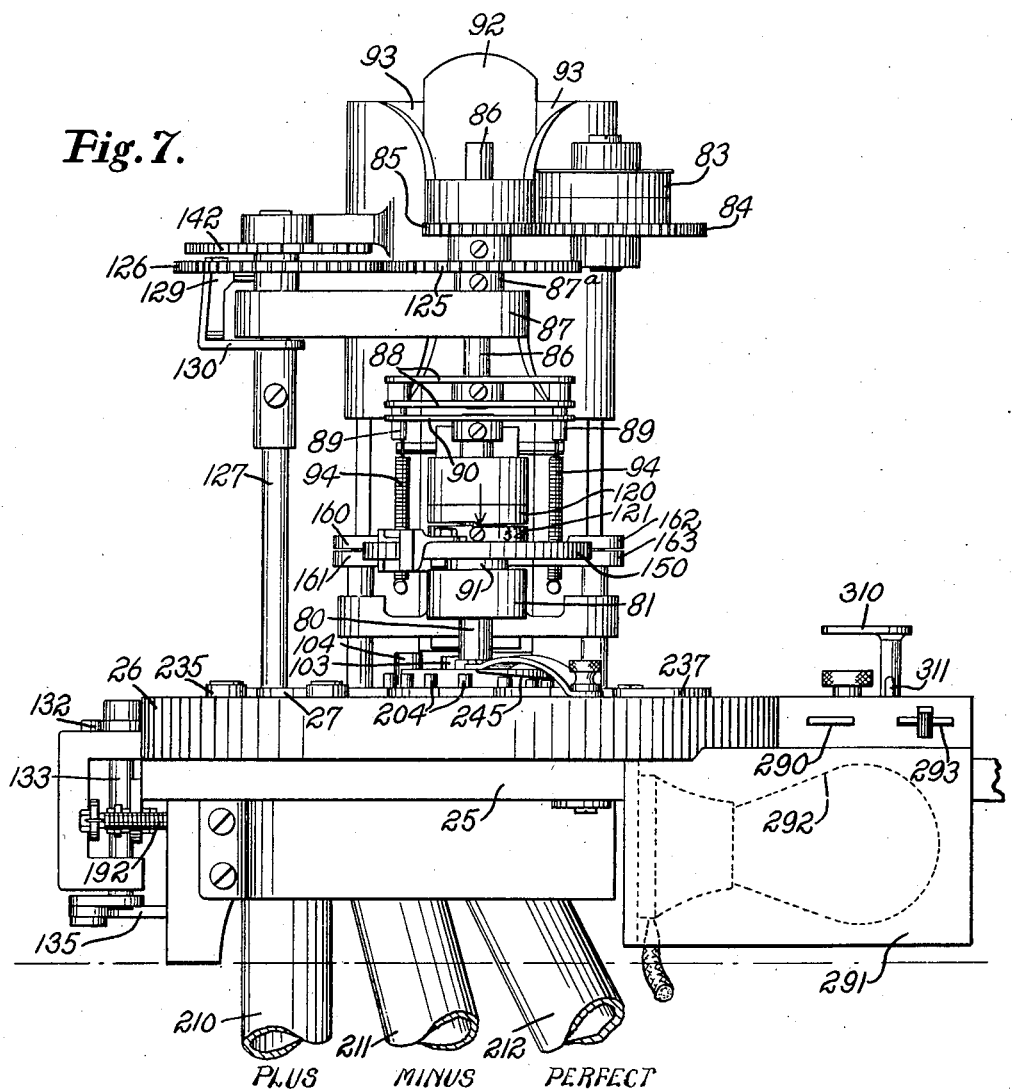

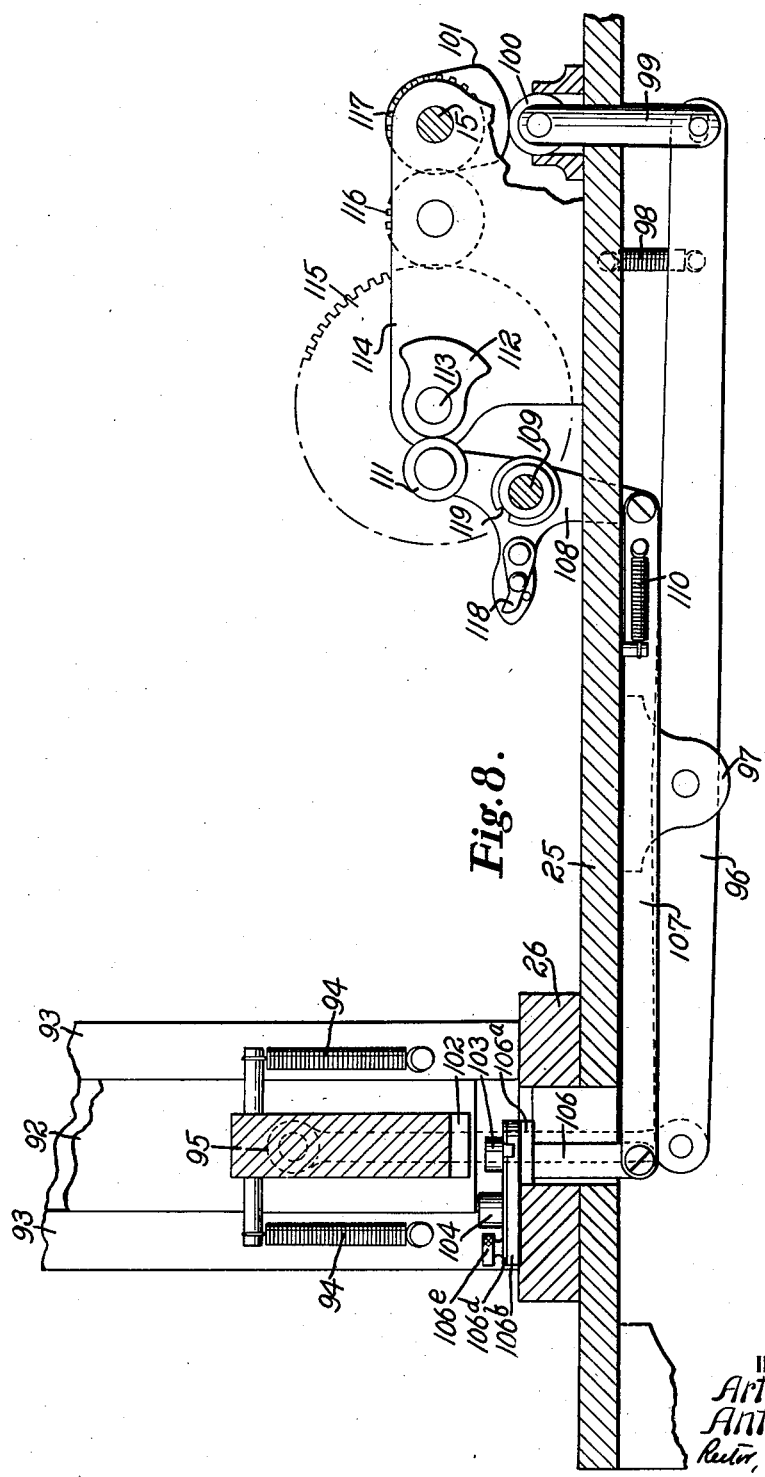

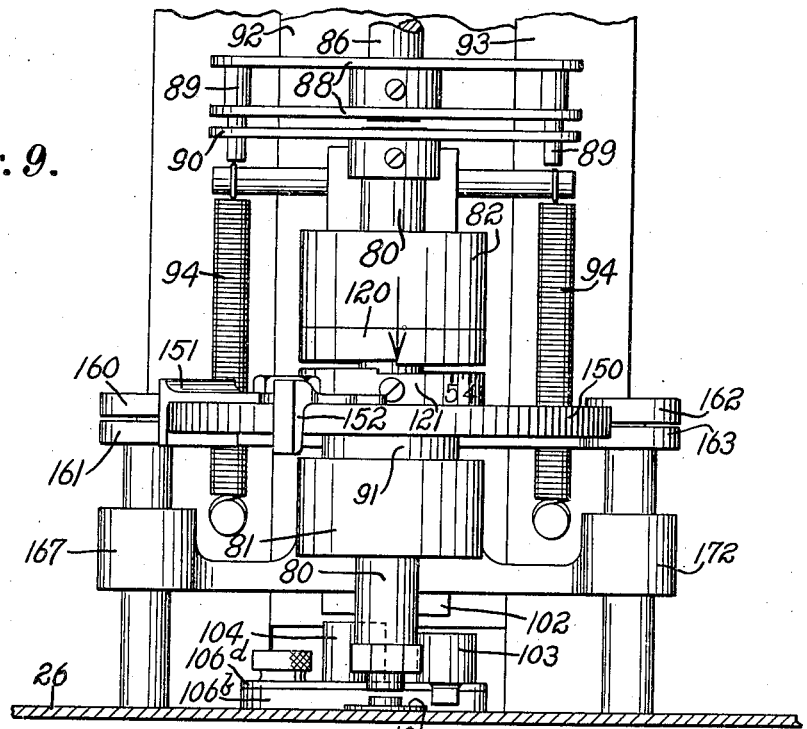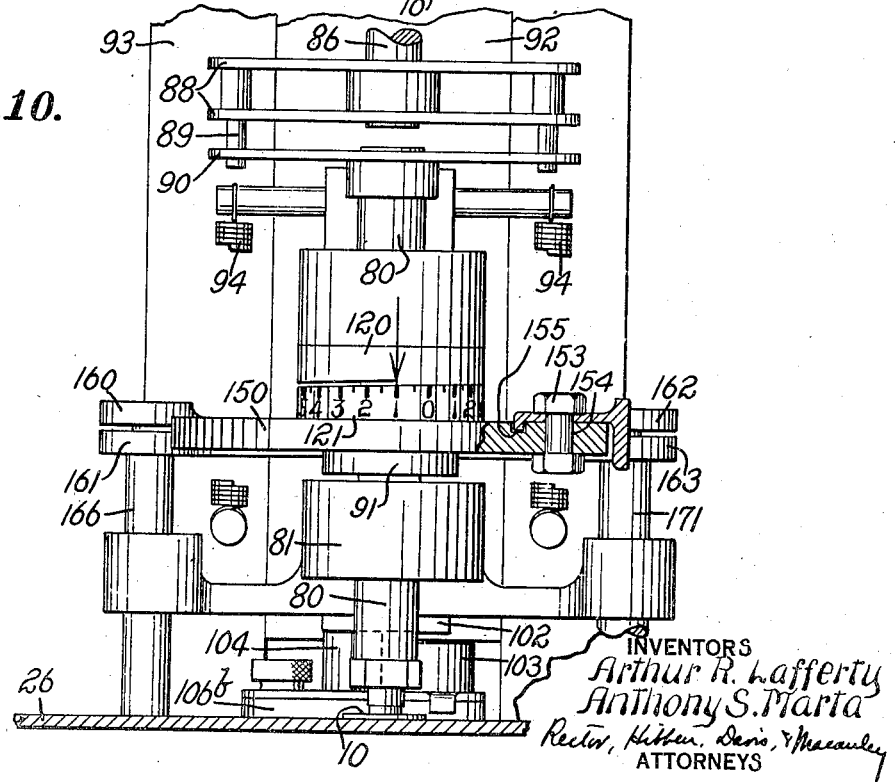

May 22, 1934.　　A. R. LAFFERTY ET AL　　1,959,867
AUTOMATIC MICROMETER
Filed March 14, 1930　　13 Sheets-Sheet 10

INVENTORS
Arthur R. Lafferty
Anthony S. Marta
Rector, Hibben, Davis & Macauley
ATTORNEYS May 22, 1934.  A. R. LAFFERTY ET AL  1,959,867
AUTOMATIC MICROMETER
Filed March 14, 1930  13 Sheets-Sheet 11

INVENTORS
Arthur R. Lafferty
Anthony S. Marta
ATTORNEYS

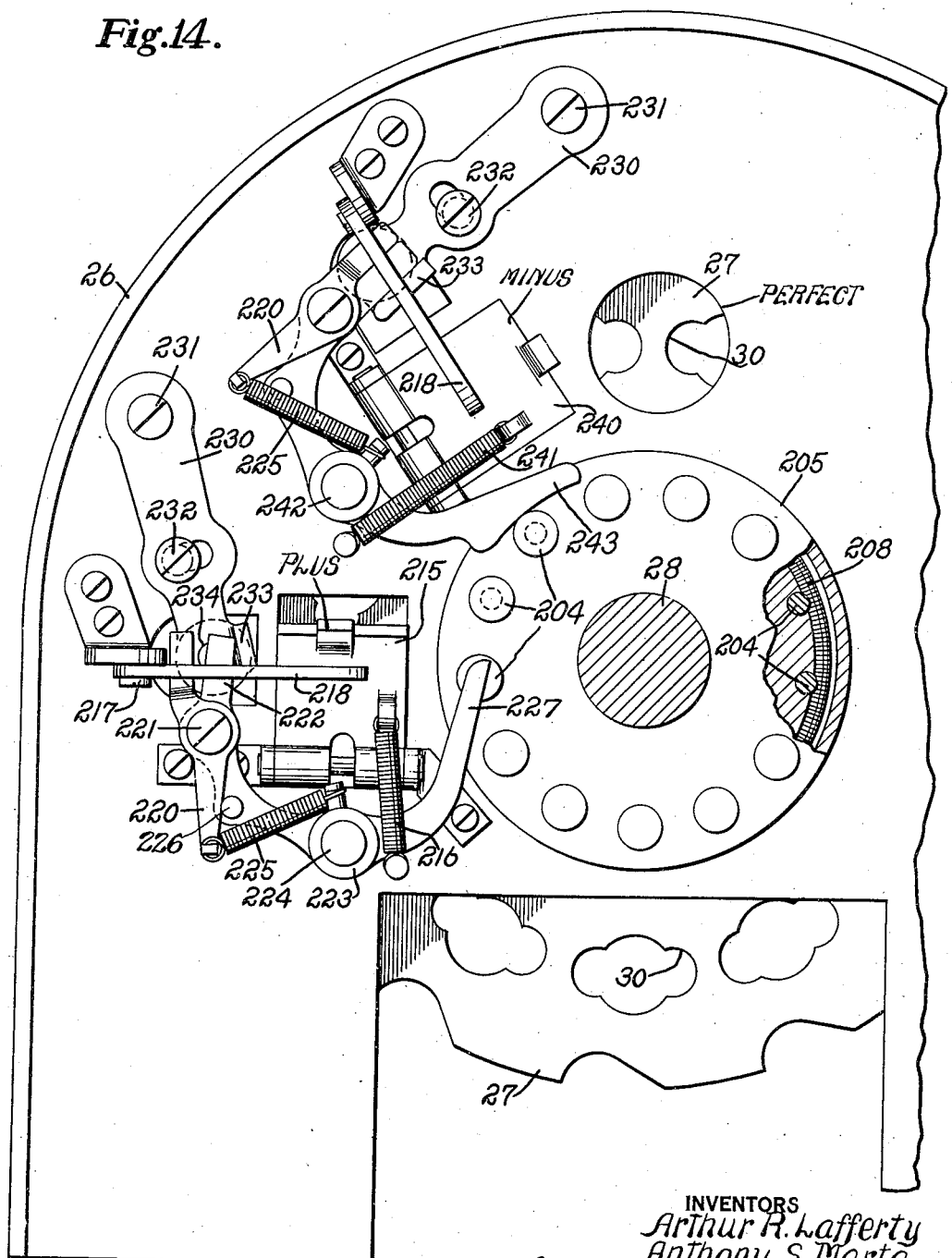

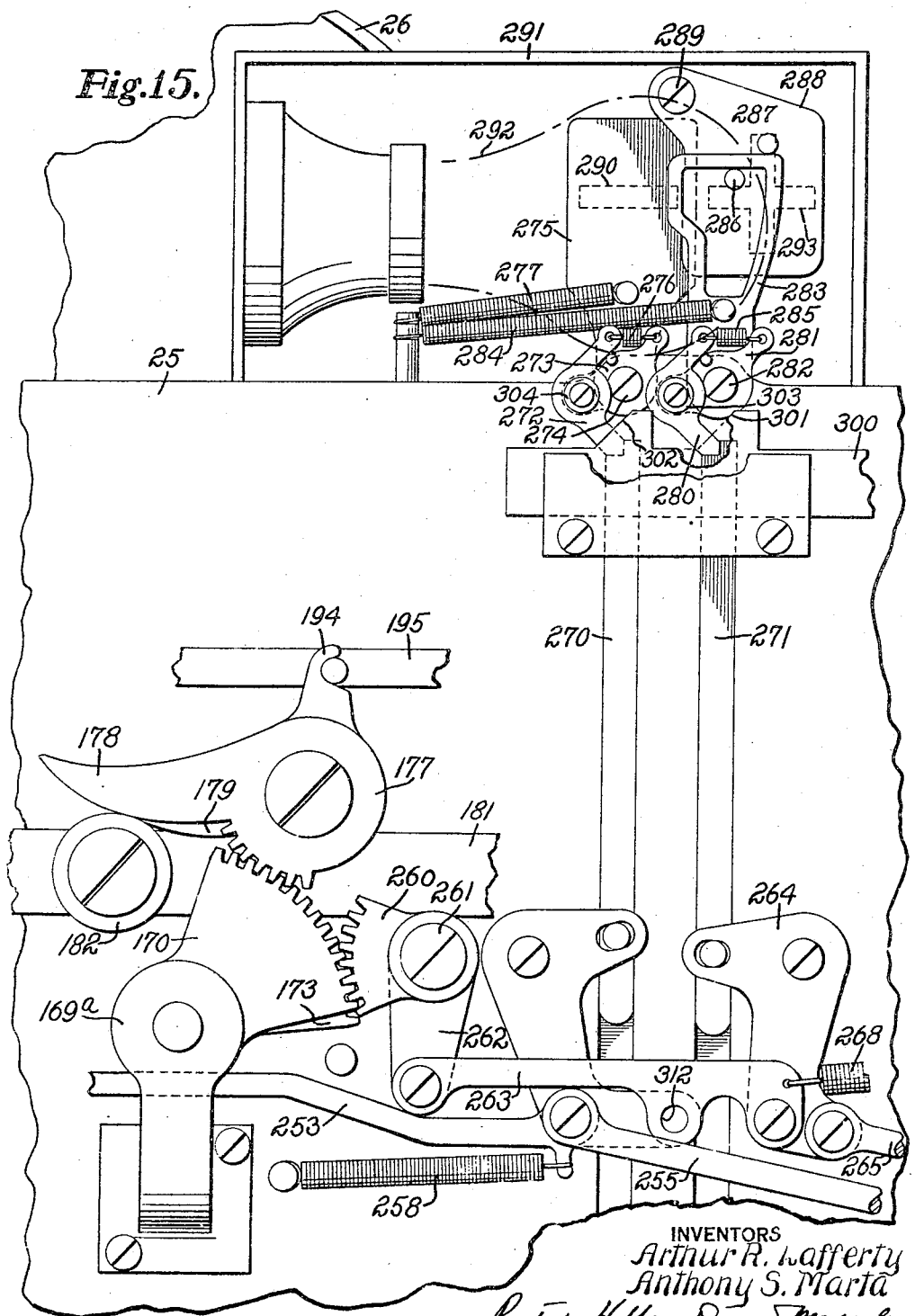

Patented May 22, 1934

1,959,867

UNITED STATES PATENT OFFICE 1,959,867

AUTOMATIC MICROMETER

Arthur R. Lafferty and Anthony S. Marta, Detroit, Mich., assignors to Burroughs Adding Machine Company, Detroit, Mich., a corporation of Michigan Application March 14, 1930, Serial No. 435,726

41 Claims. (Cl. 209—88)

This invention relates to an automatic micrometer.

Many present day articles must be made accurate within very small limits such, for example, as one ten-thousandths of an inch. Such articles, when completed, must be tested for accuracy and this is usually done by hand with a micrometer. The article is placed in the micrometer or the micrometer is placed about the article and the micrometer measuring shaft is screwed into engagement with the article after which its size may be read on the micrometer scale. This method of testing articles is very slow and tedious, particularly when the articles are made in large quantities. Furthermore, the accuracy of the test depends largely upon the skill of the operator in applying the micrometer at the same spot and with the same degree of force on each article. The present invention comprehends an automatic machine that will not only do this type of testing more rapidly but also more accurately.

The general object of the invention is to provide an automatic micrometer for rapidly and accurately measuring articles within very close limits.

A more particular object is to provide an automatic micrometer that will not only measure articles automatically but will sort them automatically after they are measured.

Other objects and advantages of the invention will appear from the following specification and drawings.

An embodiment of the invention is shown in the accompanying drawings in which;

Figure 1 is a plan view of the machine with the parts in normal position.

Fig. 2 is a perspective view of one of the articles to be measured;

Fig. 3 is a partial rear elevation of the power drive and the controlling means therefor;

Fig. 5a is a perspective view of some of the segment gears shown in Fig. 5;

Fig. 7 is a partial front elevation of the automatic measuring apparatus;

Fig. 8 is a partial sectional elevation taken on the line 8—8 of Fig. 1 and showing particularly the means for raising and lowering the micrometer shaft;

Fig. 9 is a partial front elevation of the micrometer shaft and the operating means therefor, the parts being shown in normal position;

Fig. 10 is a view similar to Fig. 9 with the micrometer shaft lowered to measuring position and rotated to register a measurement;

Fig. 14 is a partial plan view looking up from beneath the machine and showing particularly the trap door control of the sorting mechanism;

Fig. 15 is a partial plan view of the underside of the machine showing the automatic signal mechanism for forewarning the operator when the parts being measured are beyond the desired limits.

Figure 4:
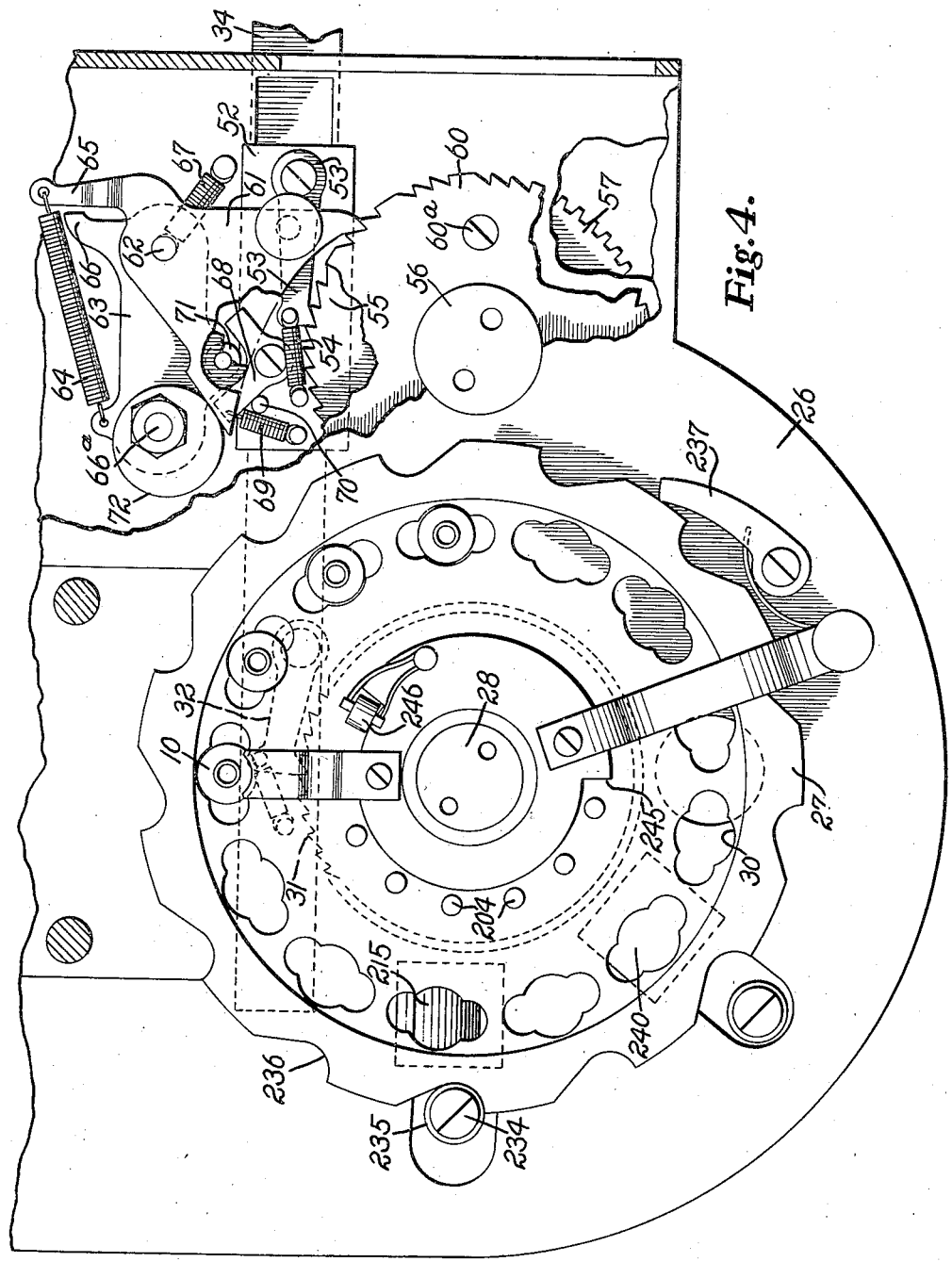
Fig. 4 is a plan view of the carrier used to move the articles to and from measuring position.

An understanding of the machine can best be had by describing it as it is made and used to measure a particular article but it is not intended that such description shall convey the idea that the machine has only a limited use because, as will later appear, the machine can be used to measure a wide variety of articles.

One of the articles that the machine is adapted to measure is shown in Fig. 2. It comprises a flanged collar 10 that must be measured at three places, to-wit, the thickness of the flange at A, the depth of the collar at B; and the thickness of the flange at C, the measurement at C being at a point approximately diametrically across from A. In this particular article the dimensions A and C must be within five ten-thousandths of an inch (.0005") of the correct dimension, while the dimension B must be within two ten-thousandths of an inch (.0002") of perfection.

The automatic machine is power driven and the power drive will be first described after which the various mechanisms that are operated by said drive will be described separately.

Power drive

The power drive includes an electric motor 11 (Fig. 1) that rotates a shaft 12 carrying a worm 13 (Fig. 3). The worm 13 meshes with a worm wheel 14 that drives the main shaft 15 of the machine through a clutch 16. The main drive shaft 15 has a number of cams and gears on it (Fig. 1) for operating various parts of the machine that will be later described.

The clutch is controlled by means of a vertically slidable member 17 having a stud 18 on its lower end. The stud 18 operates in a slot 19 in a cam slide 20 controlled by a hand lever 21 shown in Figs. 1 and 5. The latter has three sections, namely, a "stop", a "start", and a "run" position.

When the hand lever is in the "stop" position the cam slide 20 occupies the position of Fig. 3 in which position the stud 18 is in the upper end of the slot 19 and the slide 17 is in its upper position. With the parts thus positioned the clutch is disconnected leaving the main drive shaft of the machine stationary while the motor continues to revolve.

When the lever 21 is moved to the "start" position the cam slide 20 is moved to the right as viewed in Fig. 3 which moves the stud 18 downward to the dotted line position of said figure. This connects the clutch to cause the motor to drive the machine. When the cam slide 20 is in this position the clutch slide 17 is held against upward movement by the high point 22 of the cam. The "start" position is a temporary position for purposes that will be later described.

When the hand lever is moved to the "run" position the cam slide 20 is moved further to the right as viewed in Fig. 3 so as to cause the high point 22 of the cam to clear the stud 18. This leaves the stud remaining in the dotted line position of Fig. 3, but the stud is free to be moved upward to move the slide 17 up to disconnect the clutch. This freeing of the slide 17 is for the purpose of enabling the motor to be automatically stopped by connections that will be later described.

When it is desired to stop the machine the lever 21 is moved back to the "stop" position which moves the cam slide 20 to the left as viewed in Fig. 3 whereupon the stud 18 enters the slot 19 and the slide 17 is positively cammed upward to disconnect the clutch.

*Article positioning means*

The articles to be measured are automatically moved to and held in their several measuring positions by mechanism driven from the main drive shaft 15, said mechanism also acting to move the articles to their discharge stations as will later appear.

Referring to Fig. 1, the frame 25 of the machine supports a relatively heavy plate 26 on which the articles rest. This plate should be accurately made and firmly positioned so that the articles will be solidly supported when in measuring position.

Mounted on plate 26 is an endless carrier in the form of a circular plate or disk 27 fixed to a shaft 28 journaled in plate 26. The disk 27 has a plurality of openings 30 near its outer edge whose shape varies to suit the requirements of the different articles to be measured. In the machine illustrated, each opening has a central circular portion to receive the large diameter flange of the collar 10. There is a semi-circular extension on each side of this opening, such extensions being necessary in this case because the thickness of the flange at the points A and C is less than the thickness of the carrier disk 30 so that the latter must be cut away in order that the micrometer shaft will not strike the disk 27 instead of the collar to be measured.

The articles to be measured are fed into the openings 30 where they rest upon the plate 26. In the present instance, the articles are fed to and placed in the holes 30 by hand but, if desired, a suitable automatic feed could be used for feeding the articles from a hopper to the disk, there being many well known feeding devices capable of performing this operation.

Figure 5:
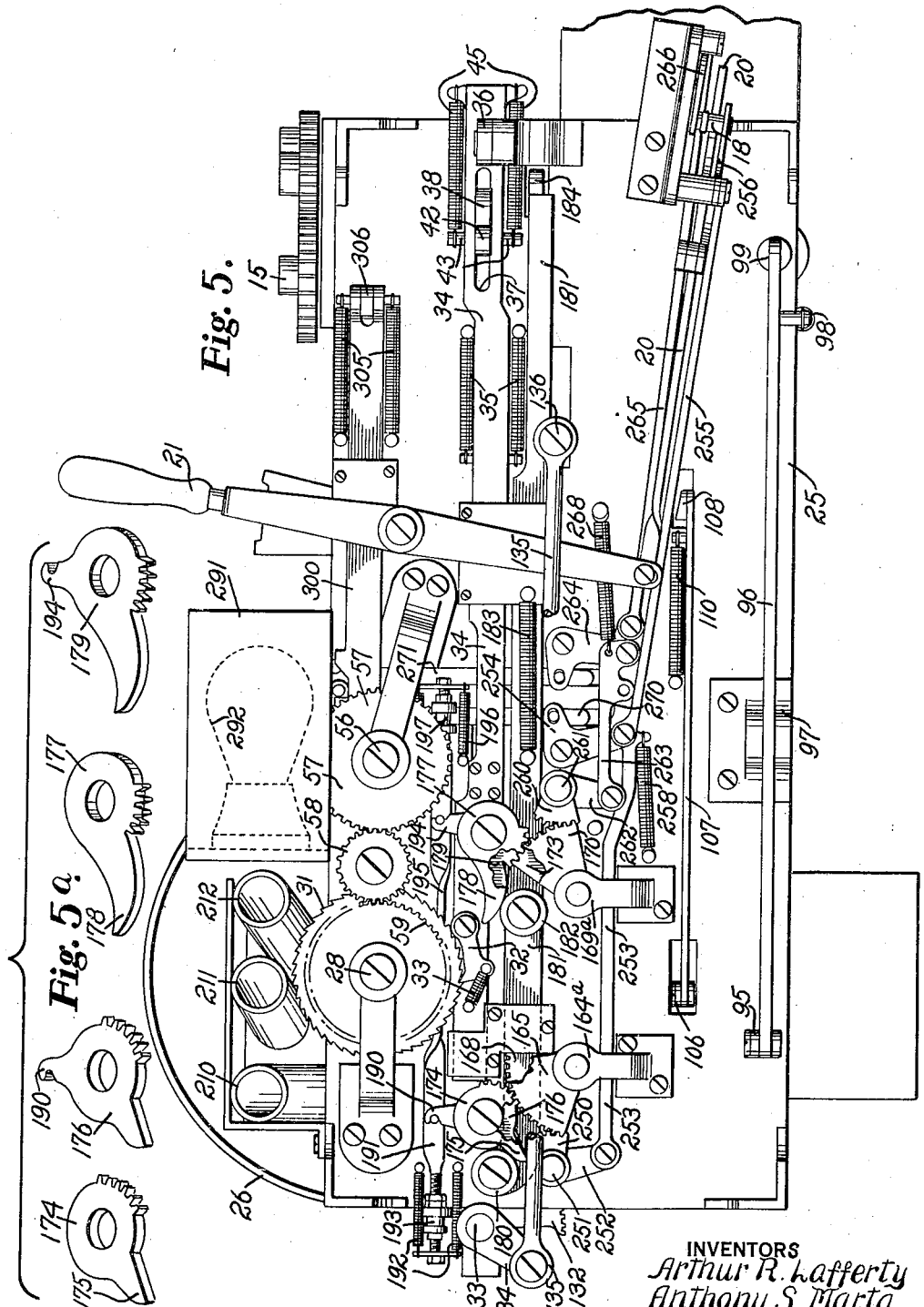
Fig. 5 is a plan view looking at the machine from beneath.
Figure 6:
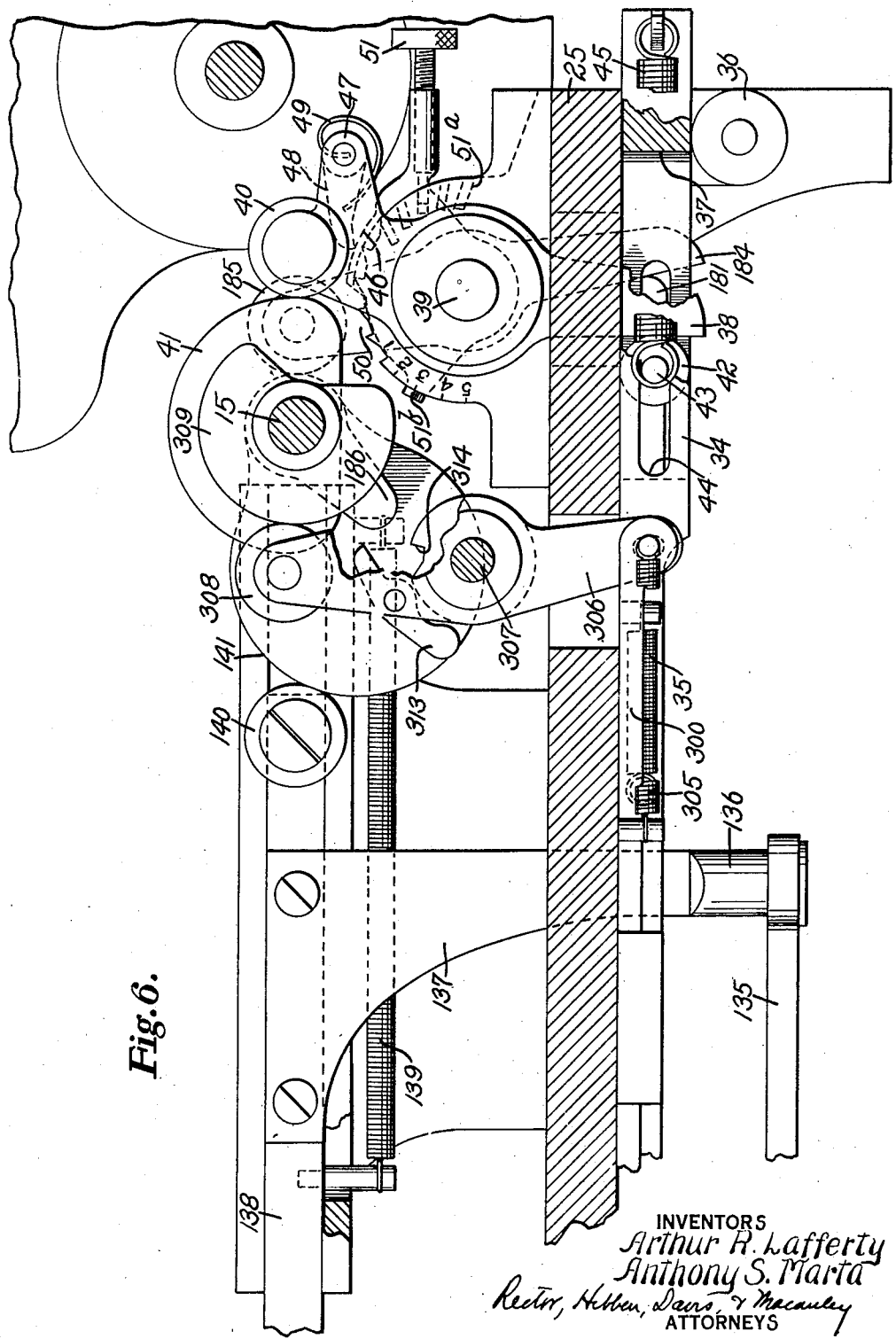
Fig. 6 is a partial section showing particularly the driving connections of the machine, the view being taken on the line 6—6 of Fig. 1.

The carrier disk 27 is moved step by step in a counterclockwise direction as viewed in Fig. 1 by a ratchet mechanism operated from the main drive shaft 15. Referring to Fig. 5, which is a bottom view, it will be observed that the shaft 28 to which the carrier disk 27 is fixed has a ratchet wheel 31 fixed to it on the underside of plate 26. Cooperating with this ratchet wheel is a pawl 32 urged into engagement with the teeth of the ratchet by a spring 33. The pawl 32 is pivoted on a reciprocating slide 34 urged to the right, as viewed in Fig. 5, by springs 35. The slide 34 extends to the right-hand end of the machine and is suitably supported by a roller 36 as shown in Fig. 6. In the right-hand end of slide 34 is a vertical slot 37 in which operates the lower end of a lever 38 pivoted on a shaft 39 suitably journaled in bearings on the frame 25. The lever 38 has a roller 40 (Fig. 6) on its opposite end which is adapted to bear against the edge of a cam 41 fixed to the main drive shaft 15 of the machine. The lower end of the lever 38 bears against a roller 42 positioned in the slot 37 in slide 34, said roller having studs 43 on each side extending through horizontal slots 44 in the slide 34. Springs 45 are connected to these studs, the other ends of the springs being connected to projections on the right-hand end of the slide 34. These springs 45 tend to hold the roller 42 in engagement with the end of the lever 38.

When the high point of the cam 41 engages the roller 40 the lever 38 is rocked clockwise which causes its lower end to bear against the roller 42. This moves the slide 34 to the left as viewed in Fig. 6, the force being transmitted through the springs 45 which are stronger than the springs 35. When the low part of the cam reaches the roller 40 the springs 35 return the slide 34 to the right, the lever 38 being moved counterclockwise and the roller 40 being kept in engagement with cam 41. In this manner the slide 34 is reciprocated to cause the pawl 32 to feed the ratchet disk 31 around in a clockwise direction as viewed in Fig. 5 which would be a counterclockwise direction in Figs. 1 and 4. It will be observed by referring to Fig. 6 that the cam 41 is constructed so that, for each rotation of the shaft 15, the cam lever 38 is oscillated once to give the slide 34 one movement to the left and one to the right during each revolution of the main drive shaft 15.

The "throw" or length of path through which the slide 34 is oscillated, may be varied by means of an arcuate plate 46 shown in Fig. 6. The lever 38 has an extension 47 on which is pivoted a pawl 48 urged by a spring 49 in a direction to engage the teeth of a stationary semi-circular ratchet plate 50. The pawl is normally kept out of engagement with the ratchet teeth by the arcuate plate 46. This plate is adjustable about the axis of shaft 39 and it is held in its different positions by a plunger 51 that can be selectively positioned in holes 51a in a stationary frame member, a projection 51b acting as an indicator. As long as the arcuate plate 46 is in the path of the nose of pawl 48 the lever 38 may be freely rocked counterclockwise but, when the pawl passes the end of the plate 46, it catches in the first tooth of ratchet 50 beyond the plate whereupon movement of the arm 38 is arrested. When this occurs, the lever is stopped short of its full throw under the urge of springs 35. In other words, the slide 34 does not return so far to the right as it otherwise would. When the high point of cam 41 comes around, it will pick up the roller 40 but the path of movement of slide 34 will be shorter than maximum. This enables the step-by-step movement of carrier disk 27 to be caried. This ratchet mechanism is normally set to move disk 27, the largest step of movement necessary for the particular article being measured. In the machine illustrated, this is equal to two teeth on the ratchet wheel 31.

An auxiliary feeding mechanism for the carrier disk 27 is provided in order to control the movement of articles such as the collar 10 to different measuring positions. For example, when a collar 10 is first moved to measuring position the measurement is taken at A after which the collar must be moved a short distance to take the measurement at B. Following this, the collar must be moved another short step to permit measurement at C. After the last measurement the collar is moved away from measuring position and another is brought into position, the movement of the disk 27 being then considerably greater than when it was moved to move the collar to different measuring positions. In the case of collar 10, the carrier plate 27 must have a long step of movement followed by two short steps. These variable steps of movement are obtained by means of an auxiliary feeding mechanism as follows:

Referring to Fig. 4, which is a partial plan view, it will be noted that the slide 34 has an upward extension or block 52 to which is pivoted a pawl 53 urged by a spring 54 into engagement with a ratchet disk 55. This ratchet disk 55 is fixed to a shaft 56 that carries a gear 57 (Fig. 5) meshing with an intermediate gear 58 which in turn meshes with a gear 59 fixed to the shaft 28 which carries the carrier plate 27. It will be readily apparent that the auxiliary pawl 53 coperating with the ratchet 55 acts to feed the carrier plate in the same direction as does the pawl and ratchet 32—31.

Rotating with the shaft 56 is a controlling disk 60, the disk being loosely journaled on shaft 56 but being fixed to the ratchet 55 by a screw 60ª. This makes the disk readily detachable. The disk 60 has teeth on its periphery spaced different distances apart, that is, there are two narrow teeth followed by one wide tooth. Cooperating with these teeth is a triangular shaped pawl 61 pivoted at 62 to an arm 63, the pawl being urged counterclockwise as viewed in Fig. 4 by a spring 64 but being limited in its movement by the engagement of an arm 65 on the pawl with a limiting projection 66 on the arm 63. The arm 63 is pivoted on a stud 66ª and urged in a clockwise direction as viewed in Fig. 4 by a spring 67 to thereby cause the nose of triangular pawl 61 to engage the teeth of the controlling disk 60. Pivoted on the slide 34 is an angular tripping lever 68, said member being urged counterclockwise by a spring 69 into engagement with a limit stud 70. When the slide 34 is moved to the right in Fig. 4, the left-hand arm of the tripping lever 68 engages a cam roller 71 on the pivoted arm 63 and rocks the latter counterclockwise to move the nose of pawl 61 out of engagement with the controlling disk.

The operation of the auxiliary feeding mechanism is as follows:

As the slide 34 moves to the right (Fig. 4), the pawl 53 slides idly over the teeth of ratchet disk 55. Near the end of the right-hand movement of slide 34, the tripping arm 68 engages the cam roller 71 and rocks the arm 63 counterclockwise which moves the triangular pawl 61 out of engagement with the teeth of the controlling disk 60. When this occurs the spring 64 snaps the pawl 61 slightly counterclockwise until its arm 65 engages the limiting projection 66 thereby moving the pawl to a position to prevent it from immediately engaging the teeth on the disk 60 when the slide 34 moves to the left.

As the slide 34 begins its movement to the left (Fig. 4) the pawl 53 engages the teeth of ratchet wheel 55 and moves the latter counterclockwise which moves the carrier disk 27 counterclockwise. The tripping arm 68 releases the cam roller 71 whereupon the pivoted arm 63 is moved clockwise by its spring 67 to move the nose of pawl 61 into engagement with the control disk 60. Because of the slight movement given pawl 61 by spring 64 when the pawl was released, the nose of the pawl will not re-engage its previously engaged tooth and now engages the top of the next tooth and, as the slide 34 continues to move, the nose of the pawl moves into the next notch on the controlling disk. The controlling disk 60 moves with the ratchet disk 55 until the nose of pawl 61 strikes the bottom of the next notch in disk 60 whereupon both the controlling disk and the ratchet disk are arrested. When this occurs the pawl 61 is rocked clockwise on its pivot 62 against the tension of spring 64, the movement of the pawl being limited by engagement of one of its sides with an adjustable eccentric 72 mounted on stud 66.

If the tooth on which pawl 61 rested after the above movement was one of the small teeth, the controlling disk 60 is arrested after a very short movement and before the slide 34 has reached the limit of its movement to the left. This short movement is the movement given the carrier disk 27 to move the article from one measuring position to another. When the controlling disk 60 is arrested, the pawls 53 and 32 are in engagement with their ratchet disks and exert a force tending to move said disks against the holding action of the controlling disk 60. However, the controlling disk 60 is positively blocked by the pawl 61 so that the ratchet disks cannot move but the lever 38 actuating slide 34 can continue its movement because the springs 45 will yield.

When, during the above operation, the nose of the pawl 61 rests on the top of one of the broad teeth of the controlling disk, it will be apparent that, the next time the slide 34 moves the ratchet disk 55, the control disk 60 will not be arrested by the pawl 61 as quickly as in the operation above described. Under such conditions, the ratchet disk 55 is moved by the slide 34 far enough to shove the carrier disk 27 a distance approximately equal to the distance between the openings 30 in it, that is, far enough to move another article to measuring position.

In this manner, the carrier disk is given one long step of movement followed by two short steps which results in moving an article to its first measuring position, subsequently moving the article two short steps to different measuring positions, and then moving the article away while another is brought up to its first measuring position. By changing the arrangement of the teeth on controlling disk 60 the length and sequence of strokes can be varied.

One of the advantages of the adjustable plate 46 (Fig. 6) which limits the movement of slide 34 is that, for short movements of the carrier 27, the springs 45 are not fully stretched. If the movement of slide 34 were not shortened, the blocking action of disk 60 would prevent movement of the slide 34 at a point where the continued movement of arm 38 would stretch springs 45 very materially.

In case it is desired to measure articles that do not require movement to different measuring positions the control disk 60 can be replaced by one having an even spacing of teeth, it being desirable to use the control disk in all cases, as it, in combination with the pawl mechanism, forms an escapement device that positively controls the movement of the carrier disk 27. It is to be understood, of course, that when changes are made in the control disk 60 appropriate changes are often necessary in the length of the stroke of the slide 34 which can be controlled by the adjustment heretofore described.

From the description thus far given, it will be clear that the articles to be measured are automatically moved to initial measuring position, they are then automatically moved to different measuring positions, and these movements may be controlled and varied to suit the requirements.

Micrometer mechanism

The micrometer includes a measuring member that is moved into measuring engagement with the articles in much the same manner as in the case of a hand operated micrometer except that, in the present machine, the action is automatic. This measuring member is rotatable and, for convenience, will be called the "micrometer measuring shaft", or head.

The micrometer measuring shaft 80, Figs. 7, 9 and 10, is rotatably mounted in bearings 81 and 82 and rotated by a spring operated drum 83. The spring drum 83 is connected to a gear 84 meshing with a gear 85 on a shaft 86 journaled in a stationary bearing 87 and held against downward movement by a thrust collar 87ᵃ. The shaft 86 carries a crosshead 88 on its lower end having two studs 89 projecting downward from it, the studs being slidably received in openings in a crosshead 90 on the micrometer shaft 80. This construction forms a driving conection that enables the spring drum 83 to rotate the micrometer shaft 80, and, at the same time, permits a sliding movement between the micrometer shaft 80 and the driving shaft 86 for a purpose that will presently appear. Downward movement of shaft 80 is normally limited by a collar 91 that engages bearing 81, but said shaft is otherwise limited during measuring operations as will presently appear.

Each time an article is brought to measuring position the micrometer shaft is turned into measuring engagement with it by the spring drum. Inasmuch as the spring drum exerts the same force each time upon the micrometer shaft, it is evident that the micrometer will be operated in the same manner each time and the measurements will be more uniform than could possibly be obtained with a hand micrometer. This means that the accuracy of measuring the articles by automatic machine is higher than when they are measured by hand.

The manner in which the micrometer is actuated and controlled in its measuring operations will be clear from a description of the following mechanisms that are associated with it.

Quick action mechanism

When articles such as the collar 10 are to be measured, the vertical position of the micrometer shaft when measuring at B is considerably different than when measuring at A and C. The initial position of the shaft prior to each measuring operation must be high enough to clear the surface B. If the shaft were to be turned from this position into engagement with the collar at A or C, the vertical movement necessary would be very appreciable. To turn the shaft through this distance would not only require time, but the force with which the spindle would be brought into engagement at the points A and C under the influence of the spring drum would be greater than at the point B because the parts would have attained considerable momentum. Provision is made for overcoming this difficulty and making the measuring action very rapid.

The bearings 81 and 82 in which the micrometer shaft 80 is journaled are carried on a slide 92 (Fig. 8) mounted in guideways 93 on the machine frame. This slide is urged downward by springs 94, but it may be moved upward against the force of the springs by a crank arm 95 (Fig. 8) attached at its upper end to the slide 92 and connected at its lower end to one end of a rock arm 96 pivoted on a bracket 97 on the machine frame. This rock arm is urged counterclockwise by a spring 98 which assists the springs 94. Pivoted to the opposite end of the rock arm 96 is a plunger 99 carrying a cam roller 100 engaging a cam 101 on the main drive shaft 15. Each time the main drive shaft 15 is rotated the cam 101 moves the plunger 99 downward which rocks the arm 96 clockwise and raises the slide 92 to move the micrometer shaft 80 to its upper position, the shaft being lowered again by the tension of springs 94 when the cam 101 releases the plunger 99. In other words, the micrometer shaft 80 is raised and lowered once during each revolution of the main drive shaft 15 of the machine, it being understood that this timing can be changed if desired by providing cams of different contours.

The slide 92 carrying the bearings of the micrometer shaft 80 also carries a block 102 (Fig. 8) adapted to engage a limit stud or stop 103 on the bed plate 26, which stud arrests the descent of the slide 92 under the action of the springs 94. The block 102 and the stud 103 are very accurately made and positioned so as to arrest the slide at a given position relative to the article to be measured.

The micrometer shaft may thus be reciprocated vertically independently of its turning movement. This permits it to be quickly moved downward to a position where only a limited turning movement is required to bring it into measuring engagement with the article. The shock of stopping the parts is taken by the limit stud thereby avoiding damage to the micrometer mechanism. The construction promotes speed in the use of the machine and enables higher accuracy to be obtained because the micrometer shaft need be turned only a short distance for the actual measuring action and the spring controls can be made to act more uniformly.

In measuring the different surfaces of articles such as the collar 10, it is evident that the micrometer shaft must be arrested in different vertical positions in accordance with the depth or thickness of the surfaces to be measured. Provision is accordingly made to automatically vary the extent of reciprocation of the micrometer shaft in accordance with the measurements to be taken.

Figure 8A:
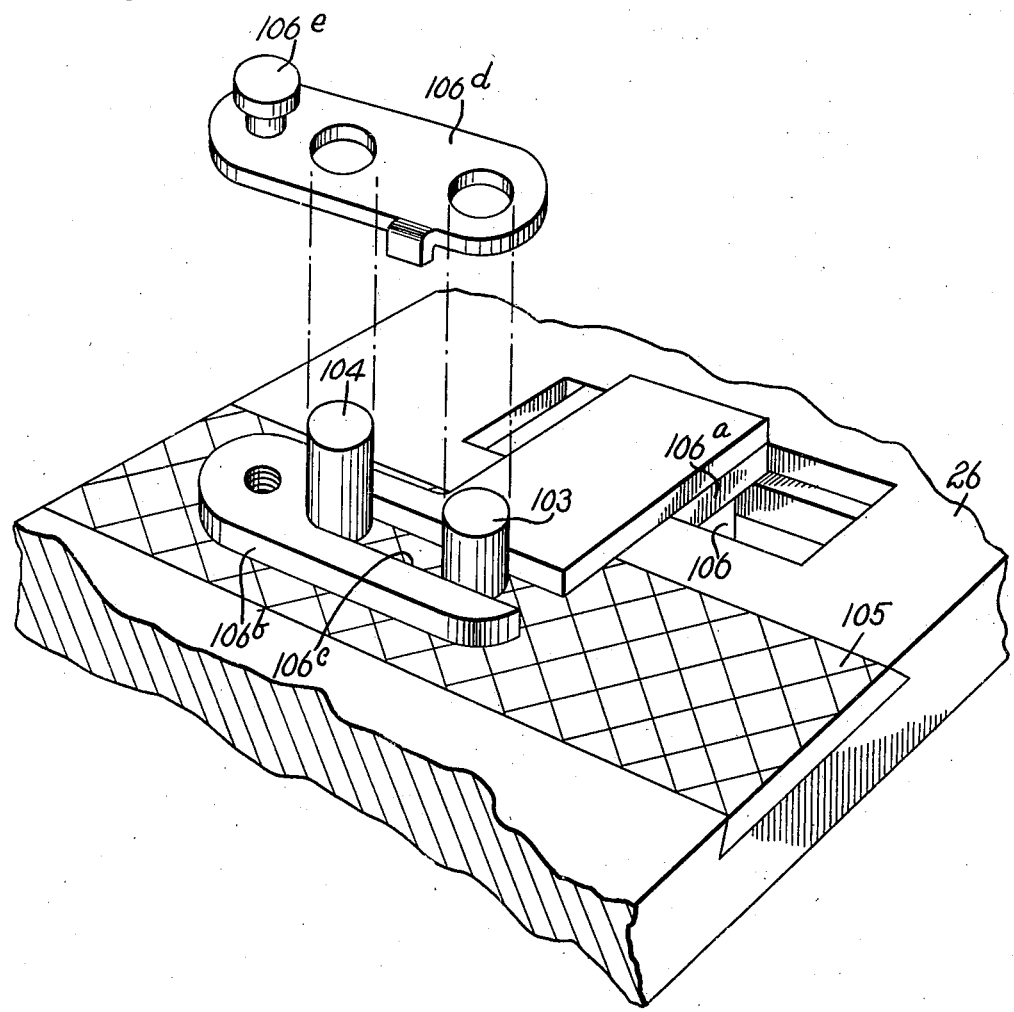
Fig. 8a is a partial separated perspective illustrating some of the parts shown in Fig. 8.

Referring to Figs. 8 and 8a, a second limit stud 150

104 is provided which is higher than the stud 103. These two studs are slidably mounted on a hardened steel plate 105 which is embedded in the bed plate 26. A plate 106ᵃ, located to the rear of the plate 105 is slidably mounted in the bed plate 26. The plate 106ᵃ has an extension 106ᵇ provided with a slot 106ᶜ for receiving the studs 103 and 104. A clamp 106ᵈ fits over the studs and holds the parts together, a suitable thumb screw 106ᵉ assisted by downwardly extending lugs from the clamp 106ᵈ acting to hold the clamp to the extension 106ᵇ with the studs 103 and 104 projecting through openings in the clamp 106ᵈ of the same diameter as the studs 103 and 104. This provides a mounting that permits the studs to be easily interchanged.

The plate 106ᵃ with the studs 103 and 104 is reciprocated by means of connections including a vertical member 106 that is connected to a three-armed lever 108 pivoted on a shaft 109. The link 107 is urged to the left, as viewed in Fig. 8, by a spring 110. The upwardly extending arm of the three-armed lever 108 carries a roller 111 adapted to be engaged by a cam 112 fixed to a shaft 113 carried in bearings 114 on the machine frame. The shaft 112 has a large gear 115 fixed to it which meshes with an intermediate gear 116, that, in turn, meshes with a gear 117 on the main drive shaft 15 of the machine. These gears reduce the speed of rotation of cam 112 as compared with the speed of the main shaft 15. As the high part of cam 112 engages the roller 111 the three-armed lever 108 is rocked counter clockwise which moves the slide 106ᵃ and its studs 103 and 104 to the right as viewed in Fig. 8 and positions the stud 104 in the path of the stop 102, the stud 103 being moved out of active position. When the high part of the cam passes the roller the spring 110 returns the link 107 to the left thereby moving the short stud 103 to active position.

In measuring the collar 10, there are two measurements requiring the short stud 103 in between which is one measurement requiring the long stud 104. The reduction gearing and the shape of the cam 112 are such that for a given collar being measured, the roller 111 engages the low part of the cam 112 during the first revolution of the main drive shaft 15, it engages the high part during the next revolution and the low part during the third revolution. The result is that the long limit stud is automatically moved to position during the intermediate rotation of the main drive shaft and while the surface B is being measured.

In the event that the surfaces to be measured are all of the same height so that only one limit stud is necessary, the automatic control of the studs 103 and 104 can be disabled by means of a latch 118 (Fig. 8) which can be moved to engage a notch 119 in a collar on the three-armed lever 108 to hold the three-armed lever out of the path of the cam 112. It will be understood that the number of studs employed and their timing can be varied to suit the requirements of the particular article to be measured.

The construction not only enables the measuring mechanism to be moved very rapidly to measuring position, but the movement is also varied automatically in accordance with the surface to be measured. This means that the measuring mechanism can be automatically brought to approximately the same position relative to the different surfaces to be measured so that the amount of turning action of the micrometer shaft for each surface is approximately the same. The action of the spring drive in turning the shaft is thus approximately the same for surfaces of different heights and a uniform and highly accurate measuring action is obtained.

The micrometer shaft 80 is moved into measuring engagement with the article by means of cooperating spiral cams. Referring to Fig. 9, a spiral cam 120 is fixed on the bearing 82 carried by slide 92. This cam is not rotatable. Fixed to and rotatable with the micrometer shaft 80 is a complementary spiral cam 121 which, when the parts are in position for the micrometer shaft to be turned to measuring position occupies a position relative to the cam 120 such as shown in Fig. 9. The parts arrive at this position under the control of the quick action mechanism. For example, as the slide 92 descends the micrometer shaft 80 engages the article being measured, but only with a light contact. The blow of the descending parts is taken by the stud 103 (or stud 104 if it happens to be in position) which arrests the slide and positions the cam 120 at a fixed distance above the article being measured. When the shaft 80 is rotated clockwise from the position of Fig. 9, the surfaces on cams 120—121 approach each other and, when they contact, rotation of the shaft 80 is arrested. The amount of rotation depends upon the space between the cams at the beginning of the rotation. This, of course, depends upon the thickness of the surface being measured. As previously mentioned, when the slide 92 moves down and is arrested by one of the limit studs 103 or 104, the cam 120 is arrested at a definite position above the article. The shaft 80 has been arrested by contact with the article being measured. The distance between cam 121 and cam 120 depends upon the height of the surface of the article being measured, that is, upon the thickness of the article.

The amount of rotation of cam 121 can be read by reading the markings on the cams but it is preferred to have the machine more automatic so that the articles will be automatically ejected in proper containers in accordance with their size without requiring that their dimensions be read on the micrometer. Before describing this mechanism, the additional controls of the micrometer shaft 80 will be explained.

Automatic uniform micrometer drive

If the spring drum acting to rotate the micrometer shaft were allowed to continue to unwind during successive operations, it is obvious that the spring would gradually become weaker and the micrometer shaft would be moved into engagement with the article with different degrees of force. Also, it will be evident that each time the spring actuates the shaft the individual movements may differ owing to the different dimensions of the article. This means that the spring may be unwound different distances during various measuring operations. In order for the tension of the spring to be absolutely uniform it must be rewound a distance corresponding to that which it is unwound in each actuation of the micrometer and provision has been made for automatically accomplishing this result.

Figure 11:
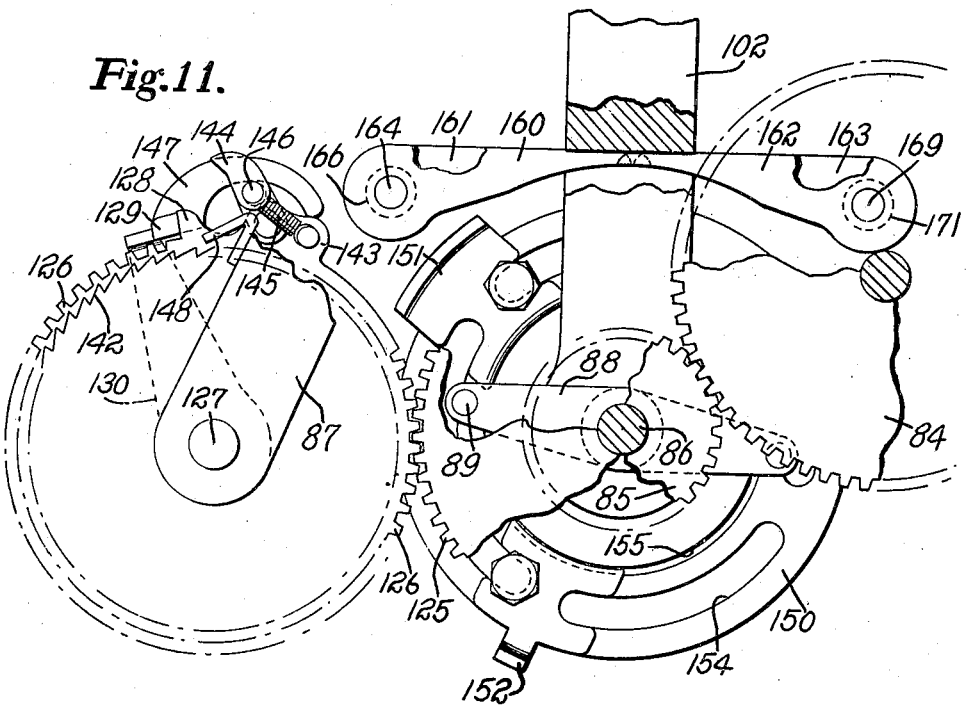
Fig. 11 is a partial sectional plan view showing the devices controlled by the micrometer shaft, the parts being in normal position.

Referring to Figs. 7 and 11, the shaft 86 that drives the micrometer shaft has a gear 125 fixed to it which meshes with a gear 126 journalled loosely on a shaft 127 mounted in bearing 87. Inasmuch as the spring drum 83 urges the shaft 86 clockwise, it is evident that it also urges the gear 126 counterclockwise. The gear 126 is normally held against movement by the engagement of a projection 128 on the gear with a lug 129 on the end of an arm 130 fixed to the shaft 127. The shaft 127 extends beneath the machine and a gear 131 is fixed to its lower end as illustrated in Fig. 1. The gear 131 meshes with a segment gear 132 (Fig. 5) fixed to a shaft 133 journaled in the machine frame. Fixed to the shaft 133 is a crank arm 134 that is connected to a link 135 extending to the right in Fig. 5 and connected at its right end to a stud 136 (Fig. 6) carried by an extension 137 of a slide 138. This slide 138 is urged to the right as viewed in Fig. 6 by a spring 139 and it carries a roller 140 adapted to be engaged by a cam 141 fixed to the main drive shaft 15 of the machine. The parts are timed so that during each revolution of the main drive shaft 15, the slide 138 is first permitted to move to the right under the influence of spring 139 and then returned to the left by cam 141 which results in moving the arm 130 (Fig. 11) counterclockwise from the position there shown to the position of Fig. 12 and returning it. The amplitude of oscillation of arm 130 is constant. When the arm 130 moves counterclockwise from the position of Fig. 11, its lug 129 releases the gear 126 which thereupon moves counterclockwise under the influence of the spring drum 83 that rotates the micrometer shaft. It will be understood that the timing is such that the gear is not released until after the micrometer mechanism has been moved downward into proper position by the quick action mechanism heretofore described.

Fixed to the stationary frame 87 is a ratchet disk 142 having teeth in its periphery. The gear 126 has a projecting portion 143 to which is pivoted a pawl 144 normally occupying the position illustrated in Fig. 11 where it is urged out of engagement with the ratchet disk by a spring 145, the movement of the pawl being limited by the engagement of a stud 146 with the inside surface of a curved projection 147 of the arm 130.

Figure 12:
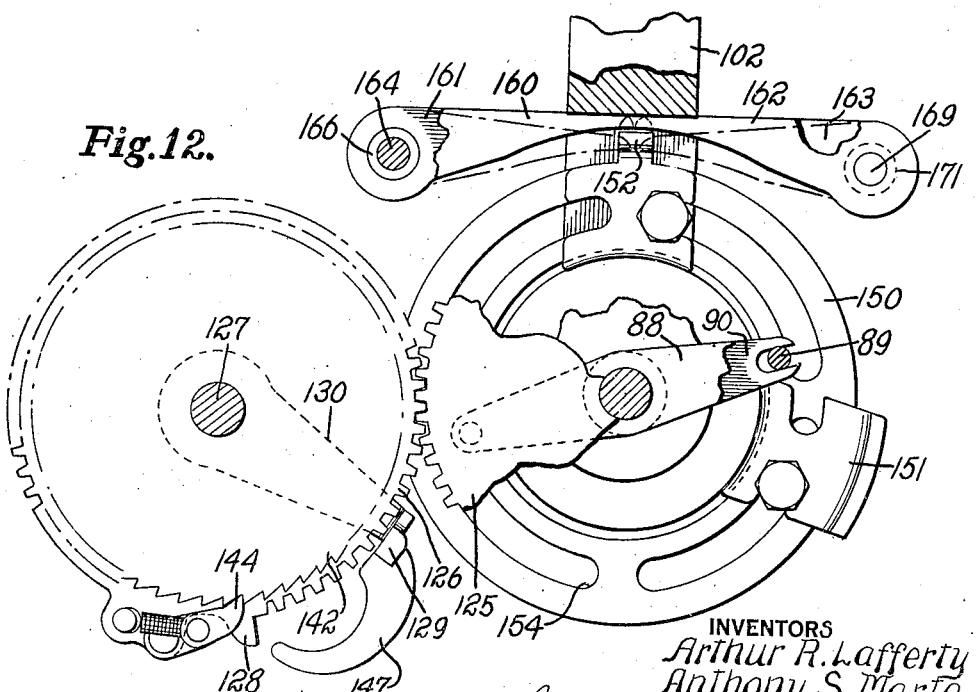
Fig. 12 is a view similar to Fig. 11 with the parts rotated to measuring position.

As the arm 130 is moved counterclockwise with shaft 127 the gear 126 follows it under the influence of the spring drum 83 and the pawl 144 is carried around with the gear. Movement of the gear 126 is stopped when the measuring cams 120—121 come into contact which means that the movement of gear 126 is variable and this variation is in proportion to the dimension of the surface being measured. As previously mentioned, the amplitude of movement of arm 130 is constant so that even though the gear 126 is stopped the arm 130 continues to move counterclockwise to the full limit of its movement (Fig. 12) which is beyond any position to which the gear 126 will move. Too rapid movement of arm 130 is prevented because such movement is controlled by cam 141 (Fig. 6) which regulates movement of slide 138 to the right under the influence of spring 139. When the gear 126 with its pawl 144 is arrested the continued movement of the arm 130 causes the curved projection 147 to quickly drag over the stud 146 on the pawl 144. This snaps the pawl into engagement with the teeth of the stationary ratchet disk 142, the spring 145 passing over the center of the pivot of the pawl and acting to hold the pawl in engagement with the disk as shown in Fig. 12. When the shaft 127 is returned clockwise toward its original position, the lug 129 on arm 130 picks up the projection 128 on gear 126 and returns said gear with its pawl 144 toward Fig. 11 position. As the pawl 144 reaches its original position, a stationary cam 148 engages the stud 146 and cams the pawl out of engagement with the ratchet disk 142, the spring 145 being again thrown over center so that it now acts to hold the pawl out of engagement with the ratchet.

This return of the gear 126 clockwise rotates the gear 125 counterclockwise and it, in turn, acting through gears 84 and 85 acts to rewind the spring drum. In this manner, the spring drum is automatically retensioned after each measuring movement and the amount of retensioning is automatically controlled so that the spring is rewound after each operation exactly as much as it was unwound in that particular operation. For example, if the spring has been unwound only very little the rewinding action will be a short one and in exact proportion to the unwinding. On the other hand, if the spring has been unwound a relatively large amount it will be rewound a corresponding amount. The latching of the gear 126 to the ratchet disk 142 prevents the micrometer shaft from being rotated by the spring drum when the shaft is raised out of engagement with the article measured by the quick action mechanism, thereby preventing noise and injury to the parts such as might occur if the shaft 80 and associated parts were entirely freed for sudden movement.

*Automatic sorting mechanism*

As previously mentioned, instead of reading the micrometer measurement, means is provided for automatically discharging the articles in accordance with their size as measured by the micrometer. In general, this comprises means for moving the articles to discharge stations combined with devices set under the control of the micrometer for automatically discharging each article at its appropriate station.

Fixed to the micrometer shaft 80 (Figs. 10 and 11) is a relatively large disk 150. This disk rotates with the shaft and it will be evident that, for a given angular movement of shaft 80, movement of the periphery of the disk 150 is considerably greater than the movement of any point on the shaft 80. This enables a very appreciable movement of the periphery of disk 150 to be obtained for very fine measurements by the micrometer shaft. Advantage is taken of the movement of the disk 150 to control devices for discharging the articles at different discharging stations.

Mounted on the disk 150 are control lugs or stops, of which two are used on the present machine. One of these is a wide lug 151 and the other a narrow lug 152. The lugs are attached to the disk 150 by bolts 153 that project through slots 154 in the disk 150, the lugs having down-turned arcuate ends fitting into a circular groove 155 (Fig. 10) in the disk. These lugs may be located at different positions around the periphery of the disk 150 for reasons that will be explained in detail later and lugs of different widths may be employed as the conditions require.

Figure 13:
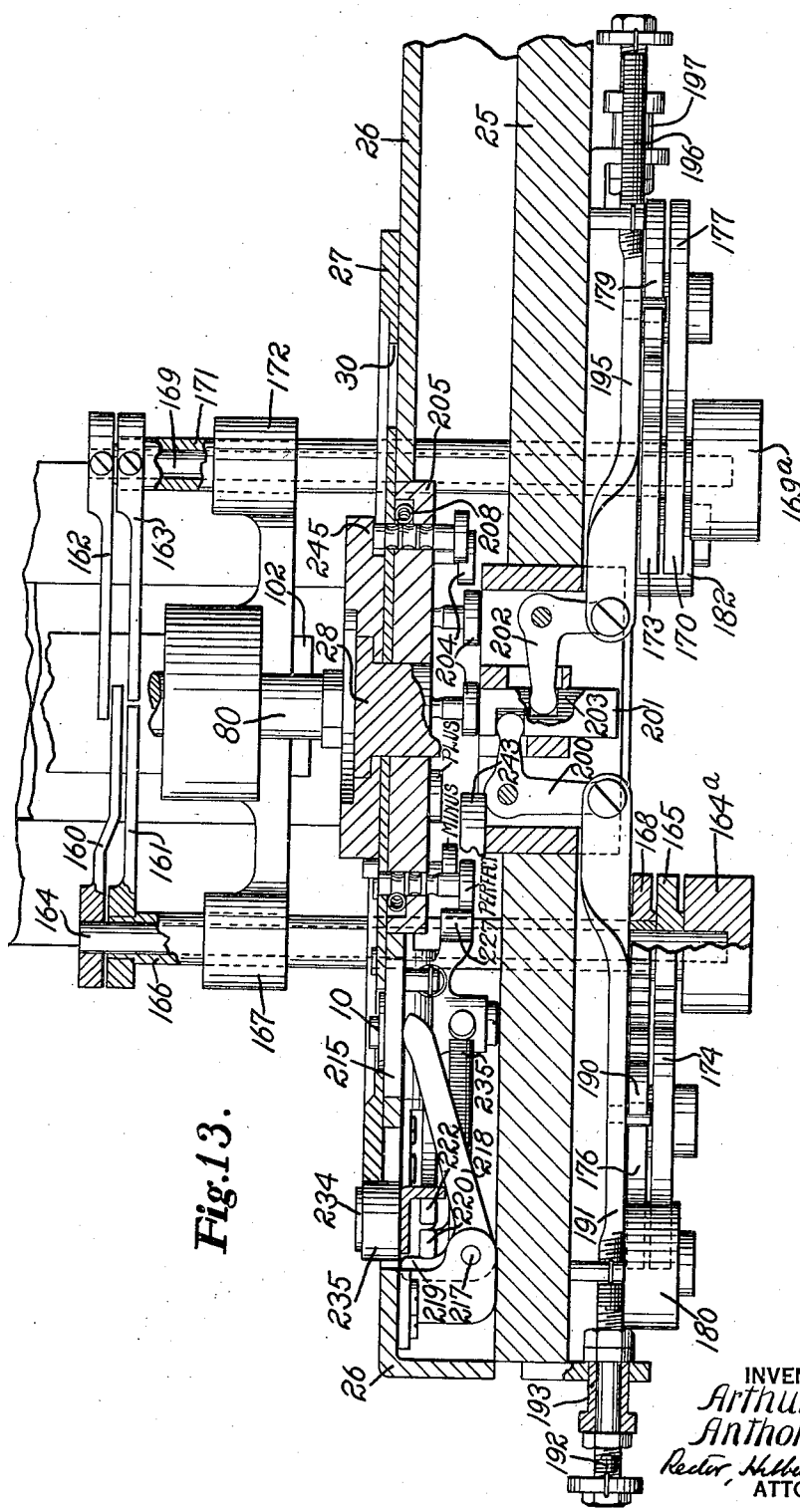
Fig. 13 is a partial sectional elevation showing particularly the sorting mechanism.

Positioned to the rear of the disk 150 (Fig. 12) are four control arms 160, 161, 162 and 163 (Fig. 13).

The free end of the upper left-hand arm 160 in Fig. 13 projects slightly to the right of the axis of the micrometer shaft 80 and this arm is fixed to a shaft 164 that extends to the underside of the machine where a segment gear 165 (Fig. 5) is fixed to it, the lower end of the shaft being supported in a bearing 164ᵃ.

The free end of the lower left-hand arm 161 terminates approximately in line with the axis of shaft 80 as viewed in Fig. 13 and this arm is connected to a sleeve 166 that surrounds the shaft 164, the sleeve being journaled in a suitable bearing 167. This sleeve extends to the underside of the machine where a segment gear 168 is fixed to it.

The free end of the upper right-hand arm 162 in Fig. 13 extends slightly to the left of the axis of the shaft 80 and this arm is connected to a shaft 169 that extends below the machine where it is fixed to a segment gear 170, the lower end of the shaft being supported by a bearing 169ª.

The free end of the lower right-hand arm 163 is approximately in line with the axis of spindle 80 as shown in Fig. 13 and this arm is connected to a sleeve 171 suitably journaled in a bearing 172 and extending to the underside of the machine where it is fixed to a segment gear 173.

Referring to Fig. 5, the segment gear 165 meshes with another segment gears 174 provided with a lug 175 on its periphery. The segment gear 168 meshes with a segment gear 176 similar to gear 174 and having a similar outstanding lug. The segment gear 170 meshes with a segment gear 177 having an outstanding lug 178 somewhat similar to the lug 175 on gear 174. The segment gear 173 meshes with a segment gear 179 similar to 177 and having a similar outstanding lug.

The lug 175 on gear 174 and its companion lug on gear 176 are normally engaged by a cam roller 180 on a slide 181 and the lug 178 with its companion lug on gear 179 is normally engaged by a cam roller 182 which is also carried by slide 181. The slide 181 is urged to the right as viewed in Fig. 5 by a spring 183 but it is periodically moved to the left by an arm 184 shown in Fig. 6, which arm contacts the end of the slide. The arm 184 is journaled on the shaft 39 and it carries a cam roller 185 positioned for engagement by a cam 186 on the main drive shaft 15 of the machine. It will be observed that the high point of this cam is very narrow with the result that it acts very suddenly on the roller 185 and only for a short time. The roller is given a quick movement to the right which moves the slide 181 to the left and, as soon as the roller is released, the spring 183 moves the slide 181 back to the right. The slide 181 with its cam rollers 180 and 182 serves to hold the arms 160, 161, 162 and 163 in inactive position during the major portion of a machine operation. This is due to the fact that the spring 183 urges the slide to the right as viewed in Fig. 5 causing the rollers 180 and 182 to urge the segment gears 174 and 176 counterclockwise and the segment gears 177 and 179 clockwise. This urging action is transmitted to the segment gears 165, 168, 170 and 173 which respectively urge the arms 160 and 161 counterclockwise (Fig. 12) and the arms 162 and 163 clockwise to the full line positions of Fig. 12. Movement of the arms in said directions is limited by contact with the frame of the machine.

When the slide 181 is moved to the left as viewed in Fig. 5, the cam rollers 180 and 182 momentarily release the gears 174, 176, 177 and 179 which releases the arms 160, 161, 162 and 163 for movement to the dot and dash positions of Fig. 12 to which position they are urged by mechanisms that will be presently described.

Referring again to Fig. 5, the segment gear 176, which is controlled by the left lower arms 161, has a projecting arm 190 which is provided with a recess engaging a stud on a slide 191 urged to the right as viewed in Fig. 5 by springs 192. These springs exert a tension tending to rotate the gear 176 clockwise and it is the tension of these springs that moves the arm 161 to the dot and dash position of Fig. 12 when the arm is free for such movement. The movement of the slide 190 to the right under the influence of the springs 192 is limited by a stop collar 193 detachably secured to the slide, the extent of movement of the slide being varied by using different stop collars.

The gear 179 controlled by arm 163 likewise has an arm projecting from it, this arm being numbered 194 on Fig. 5. The arm has a recess engaging a stud in a slide 195 urged to the left in Fig. 5 by springs 196. The tension of springs 196 tends to move the segment gear 179 counterclockwise and furnishes the force tending to move the arm 163 to the dot and dash position of Fig. 12. The movement of the slide 195 to the left is limited by a detachable collar 197, said collar 197 and the bell crank lever 202 being proportioned so that the movement of slide 195 to the left will cause the pin 204 to be raised to its highest or "plus" position.

Referring now to Fig. 13, it will be observed that slide 191 is connected to a bell crank 200 which in turn is connected to a vertical slide 201. The slide 195 is connected to a second bell crank 202 that, in turn, is connected to another vertical slide 203. The vertical slides 201 and 203 are adjacent one another and are positioned in the path of a plurality of headed pins 204 slidably mounted in a disk 205 that rotates with the carrier plate 27. These pins are settable to three positions, namely, (1) a "perfect" position which is the lowest position as illustrated for the lefthand pin in Fig. 13; (2) a "minus" position which is the position illustrated for the second pin to the right of the left hand side of Fig. 13; and (3) a "plus" position which is the position illustrated for the third pin from the right on the left-hand side of Fig. 13. The pins are held in these positions by a spring detent comprising a spiral spring 208 (Fig. 14) engaging grooves in the stems of the pins.

As the carrier disk 27 is stepped around to measuring position, the pins move the articles to measuring position, the pins 204 pass over the tops of the slides 201 and 203, the parts being coordinated so that, when the carrier 27 is in its different measuring positions, one of the pins 204 will be over the ends of the slides, the heads of the pins being large enough to remain at least partially over the ends of the slides during all three measuring positions of the carrier disk. It will be evident that, while a pin 204 is in this position it may be set by the slides 201 and 203 under control of the arms 161 and 163 (Fig. 13).

The setting of the pins is controlled in the following manner:

When the micrometer shaft 80 is turned to measure the article the disk 150 (Fig. 11) moves with it. Assuming that the surface B of collar 10 is being measured, if the dimensions are correct, the narrow projection of the lug 152 will stop in a central position between the ends of the lower levers 161 and 163 as illustrated in Fig. 12. Immediately after this occurs the slide 181 (Fig. 5) will move to the left thereby releasing the arms 161 and 163 in a manner heretofore explained. These arms are urged toward the dot and dash position of Fig. 12 but, with the lug 152 in the central position of Fig. 12, they are blocked by the lug and no effective movement of them occurs.

On the other hand, if the collar is undersize at B within a predetermined limit which, in this case, is two ten-thousandths (.0002") of an inch, the micrometer shaft will move beyond the Fig. 12 position and the lug 152 will be positioned to the right beyond the end of arm 161, but not beyond the end of arm 160. This releases arm 161 for movement, but still blocks arms 160, 162 and 163. With arm 161 free, it moves to the dot and dash position of Fig. 12 when released by roller 180 (Fig. 5) and, in so moving, it permits the springs 192 to move the slide 191 to the right in Fig. 13 thereby raising the vertical slide 201. The movement is limited by collar 193 and is just enough to raise pin 204 to its intermediate or "minus" position.

If the article is oversize within a predetermined limit which in this case is two ten-thousandths of an inch (.0002"), the lug 152 will stop short of central position so that arm 163 will be free while the arms 160, 161, and 164 will remain blocked.

When arm 163 is free, it moves to the dot and dash position of Fig. 12 when released by roller 182 (Fig. 5) and, in so moving, permits springs 196 to move slide 195 to the left in Fig. 13 thereby raising the vertical slide 203. The movement is limited by collar 197 and is just sufficient to raise the pin 204 to its upper or "plus" position.

In this manner, the pins 204 are set as each article is measured, it being understood, of course, that when the article is of the correct dimensions neither of the arms 162 or 164 will be permitted to move and the pin 204 will remain in its lowermost position. The pin that is set as related to a given article is the pin that is on the same radial line as the opening that holds the article. In other words, a pin is set for every article and, as the article moves away from measuring position, its set pin moves with it. Visualized in another manner, the carrier disk 27 is a type of endless conveyor that carries the articles from measuring position to discharge stations, the conveyor having stops set on it at the time the articles are measured which automatically cause the articles to be discharged at the proper station.

An important point to note is that the machine will operate with surfaces of different dimensions, such as A and B, with stops 151 and 152 on the same disk. It will be obvious that if stops 151 and 152 were at the same circumferential location on disk 150, one of the stops might interfere with the other. To avoid this they are located at different positions which are far enough apart to avoid interference. Proper operation is obtained by dimensioning the studs 103 and 104 so that one of these studs limits the descent of the micrometer mechanism in a slightly different position relative to the surface to be measured than does the other. This enables the stops to be positioned differently around the periphery of disk 150 and at the same time proper measuring control is obtained.

Referring to Fig. 1, there are three stations on the present machine, to-wit, the "plus", the "minus" and the "perfect" stations. The "plus" and "minus" stations are controlled by trap doors that will presently be described while the "perfect" station is merely an opening in the plate 26 through which the collars may pass to the appropriate chute. Chutes 210, 211 and 212 are provided for the respective stations, as shown in Fig. 7, said chutes leading to suitable receptacles, not shown.

The trap doors at the "plus" and "minus" stations are controlled by mechanisms that are similar for each station, hence only one will be described, it being understood that the other operates in a similar manner.

Referring to Fig. 14 a trap door 215 is provided for the "plus" station, said door being hinged on the underside of the plate 26 and urged toward open position by a spring 216. The door is normally prevented from opening by a bell crank lever pivoted at 217 and having a horizontal arm 218 (Fig. 13) engaging the door 215. The vertical arm 219 of the bell crank lever is positioned in the path of a pawl 220 (Fig. 14) pivoted at 221 on one arm 222 of a substantially U-shaped member 223 that, in turn, is pivoted at 224 to the base plate 26. The pawl 220 is urged counterclockwise as viewed in Fig. 14 by a spring 225 into engagement with a limit stud 226 on the arm 222. The U-shaped member 223 has another arm 227 which is adapted to project into the path of the settable pins 204 that move around with the carrier disk 27.

When the carrier disk 27 is moving an article from measuring position, the trap door 215 is positively held closed by the action of an arm 230 (Fig. 14) pivoted at 231 to the underside of the plate 26, the arm being limited in its movement by a stud 232 projecting through a slot in the arm. This arm has a downwardly projecting lug 233 adapted to engage the end of the arm 222 of the U-shaped member 223. The arm also carries a stud 234 projecting through an opening in the plate 26 and carrying a roller 235, best shown in Fig. 4, adapted to engage notches 236 in the periphery of the carrier disk 27. As the carrier disk 27 is rotated counterclockwise in Fig. 4, the roller 235 is cammed out of the notch in which it is located and it rides on the periphery of the disk until the next notch is reached. This camming action swings the arm 230 clockwise from the position of the arm as shown for the "plus" station in Fig. 14 to the position shown for the "minus" station. This causes the lug 233 to engage the end of arm 222 of the U-shaped member 223 to thereby hold said arm and its pivoted pawl 220 in engagement with the arm 219 of the bell crank lever 219—218 to hold the door closed while a new article to be measured is moved to position. While the carrier is moving from one measuring position to another, the roller 235 rides up on the incline of one of slots 236 thereby tending to move the carrier clockwise as viewed from above (Fig. 4), but this clockwise movement is prevented by a spring pressed detent 237 (Fig. 4).

When the carrier arrives at its next position, the roller 235 moves into the next notch and the arm 230 is released for movement to the position shown for the plus station in Fig. 14. The spring 225 connected to pawl 220 causes this movement. Counterclockwise movement of pawl 220 on its pivot 221 is prevented by stud 226 so that the spring 225 acts on the U-shaped member 223 to move it clockwise, the arm 222 acting on lug 233 to move arm 230.

From the above it should be clear that each time the carrier 27 reaches a new position in one of its larger steps of movement, the trap door is freed for opening if the U-shaped member 223 moves. The U-shaped member 223 will move unless the head of one of the settable pins 204 is in the path of arm 227. If there is no pin to block the movement of arm 226 the spring 216 will pull the trap door open because it can move the bell crank lever 218—219 clockwise as viewed in Fig. 13 which rocks the U-shaped member 223 clockwise in Fig. 14, the spring 216 overcoming any resistance offered by spring 225 acting on pawl 220.

A similar trap door 240 is provided for the "minus" station, the door being urged open by a spring 241 and being controlled by a U-shaped member 242 having an arm 243 positioned for engagement by the pins 204. The arms 226 and 243 are positioned in different horizontal planes and are of different thickness as shown in Fig. 13. The arm 227 is positioned so that it will be contacted by the heads of the pins when they are in two positions, namely, the lower or "perfect" position and the second or "minus" position. The arm 243 is located so that it will be contacted only by the heads of the pins that are in "perfect" position.

When articles are measured that are perfect within the limits for which the machine is set, the pins 204 corresponding to such articles will not be moved up but will remain in their lower or "perfect" positions. As these pins come around to the arms 227 and 243 the heads of the pins will contact the arms at the time that the respective article is on the corresponding trap door with the result that neither of the trap doors can open and the article will be moved over both trap doors until it reaches the "perfect" opening where it will drop into the chute 212.

If the collar 10 should be undersize .0002" at B or .0005" at A or C, the corresponding pin 204 will be set in its second or "minus" position. As this pin comes around to the arm 226 it will contact said arm and prevent the trap door 215 of the "plus" station from being opened. However when the pin comes to the arm 243 it will be above said arm and the latter will be free to move with the result that the spring 241 will automatically open the door and the article will be discharged into the chute 211.

If the collar should be .0002" oversize at B or .0005" oversize at A or C, the corresponding pin 204 will be set in its upper or "plus" position. When the pin comes around to arm 227 it will be above the plane of said arm so that the arm is free to move. The spring 216 will then automatically open the door 215 and the article will be discharged into chute 210.

In this manner the articles are automatically discharged at appropriate stations in accordance with their size as measured by the micrometer.

The pins 204 are restored by a spiral restoring member 245 shown in Fig. 7 assisted by a spring pressed roller 246 shown in Fig. 4, the latter being supplementary.

*Automatic stopping mechanism*

Provision is made for automatically stopping the machine when the article being measured is undersize or oversize beyond desired limits, such articles being called "rejects". In the present machine this occurs when the measurements at A or C are undersize or oversize more than five ten-thousandths of an inch (.0005") and when the B measurement is oversize or undersize more than two ten-thousandths of an inch (.0002"). These dimensions can, of course, be changed to suit the requirements of each article. By multiplying the controlling devices that have heretofore been described, these "rejects" can be automatically discharged into appropriate chutes but in the form of the invention shown the machine is automatically stopped instead and the "rejects" removed by hand. This tends to check the operator if the articles are coming through defectively. He can immediately detect the percentage of "rejects" and report to the manufacturing department so that the error can be corrected.

Referring to Fig. 13, it will be noted that the arms 160 and 162 are prevented from moving effectively when the controlling lugs 151 and 152 are in center positions such as shown for 152 in Fig. 12. Also when the lugs are short of or beyond center within predetermined limits these arms are blocked even though 161 or 163 may be free. However, when the lugs are short of or beyond center more than a predetermined amount the arms 160 and 162 will be freed. Of course, 161 and 163 will be freed also, 161 being freed with 160 and 163 with 162.

As previously explained, the lever 160 controls the segment gear 165 (Fig. 5) on the bottom of the machine. This gear meshes with another segment gear 250 fixed to a shaft 251 to which is secured a crank arm 252 connected by a link 253 to a bell crank lever 254. Connected to this bell crank lever 254 is another link 255 extending to the right hand end of the machine where it is connected to a bell crank lever 256 as shown in Fig. 3, Fig. 3 being taken from the rear of the machine and being the reverse of Fig. 5. The nose 257 of the bell crank lever 256 is adapted to engage the stud 18 which controls the clutch of the machine, the stud being in lowered position and the clutch engaged. The link 253 is urged to the left in Fig. 5 by a spring 258 which thus tends to swing bell crank lever 256 clockwise in Fig. 3, to disengage the clutch and thereby disconnect the motor from the driving mechanism. The spring 258 furnishes the force to move arm 160 to the dot and dash position of Fig. 12.

The lever 162 controls the segment gear 170 (Fig. 5) and the latter meshes with another segment gear 260 fixed to a shaft 261 carrying a crank arm 262 connected by a link 263 to a bell crank lever 264 pivoted on the frame of the machine. The bell crank lever 264 is connected by a link 265 to a second bell crank lever 266 at the forward part of the machine (Fig. 3), the latter having a nose 264 adapted to engage the stud 18 on the slide 17 controlling the clutch. The link 263 is urged to the right as viewed in Fig. 5 by a spring 268 which thus urges the bell crank 266 counterclockwise as viewed in Fig. 3 to open the clutch. This spring furnishes the force for moving the arm 162 to the dot and dash position of Fig. 12.

If one of the arms 160 or 162 is free to move during a measuring operation, it is evident that when the cam rollers 180 and 182 release the gears 174 and 177 one of the segments 165 or 170 will be moved, depending on which of the levers 160 or 162 is free.

Assume, for example, that the arm 160 is free to move. When the gear 174 (Fig. 5) is released by the roller 180 the spring 258 pulling on link 253 will rock the segment gear 165 counterclockwise (Fig. 5), such movement being permitted because the arm 160 is free, the spring 258 furnishing the power to move the arm. Movement of the link 253 to the left causes the link 255 to be pulled to the left and rocks the bell crank lever 256 clockwise to raise the slide 17 to disengage the clutch thereby stopping the machine.

The same type of action takes place when the lever 162 is free to move except that, in such event, the spring 268 acts to pull the link 263 to the right in Fig. 5 rocking segment gear 170 clockwise to rock arm 162 to the dot and dash position of Fig. 12. This moves the link 265 (Fig. 5) to the right, or to the left in Fig. 3, thereby rocking bell crank lever 266 counterclockwise to raise the slide 17 to disengage the clutch.

Accordingly, when an article is undersize or oversize beyond certain predetermined limits, the machine is automatically stopped. The oversize or undersize dimensions at which it is stopped vary according to the setting of the machine. In the machine illustrated, this occurs when the dimension B is over or undersize more than two ten-thousandths of an inch (.0002"), such limit being controlled by the narrow lug 152 (Figs. 11 and 12). Automatic stopping of the machine also occurs when the dimensions A or C are oversize or undersize more than five ten-thousandths of an inch (.0005"), such limits being controlled by the wide lug 151 of Figs. 11 and 12. In other words, the machine is automatically stopped under two different sets of conditions in measuring the same article.

Automatic signal

In addition to stopping the machine a signal is automatically displayed which not only informs the operator that the article is a "reject", but it also informs him whether it is an oversize or an undersize "reject".

Referring to Fig. 15, the bell crank lever 254 controlled through link 253 by the arm 160 is connected to a horizontal slide 270 while the bell crank lever 264 controlled through link 263 by the arm 163 is connected to another horizontal slide 271.

The upper end of the slide 270 has a notched end in which engages a pawl 272 pivoted on an extension of a member 273 pivoted at 274 to the machine frame and rigidly connected to a shutter 275. The pawl 272 is urged clockwise by a spring 276 against a limit stud and the shutter 275 is urged counterclockwise by a spring 277.

The upper end of slide 271 also has a notched end in which engages a pawl 280 pivoted to an extension on a member 281 pivoted at 282 to the frame of the machine and rigidly connected to a cam 283 which is urged counterclockwise by a spring 284. The pawl 280 is urged clockwise by a spring 285 against a limit stud. The cam 283 is adapted to contact studs 286 and 287 on a shutter 288 pivoted at 289.

The shutter 275 normally closes a "minus" opening 290 in a casing 291 in which is located an electric light 292. The shutter 288 normally closes a "plus" opening 293 in the same casing; the "plus" and "minus" openings being positioned at the front of the machine as shown in Fig. 1.

When an article is undersize enough to be a "reject", the link 253 is moved to the left as viewed in Fig. 15 in a manner hereinbefore described. This rocks the bell crank lever 254 clockwise and pulls the slide 270 downwardly, thereby releasing the pawl 272. This releases the shutter 275 which is then rocked counterclockwise by its spring 277 to expose the "minus" opening 290 so that light will shine through this opening to give the operator a signal and to indicate that the article is an undersize "reject".

A similar action takes places when an article is oversize except that, in such event, the bell crank lever 264 is rocked counterclockwise pulling the slide 271 downwardly and releasing the pawl 280. The cam 283 is thereupon snapped counterclockwise by spring 284 and the inner edge of the right-hand side of cam 283 moves the shutter 288 clockwise to reveal the "plus" opening so that the light will give the operator a signal that the article is an oversize "reject".

In order to restore the shutters a slide 300 is provided having cam projections 301 and 302 that engage rollers 303 and 304 on the pivot studs on which the pawls 272 and 280 are pivoted to members 273 and 281. The slide 300 is urged to the left by springs 305 (Figs. 1 and 6) and movement of the slide is controlled by a lever 306 pivoted on a shaft 307 on the base or frame of the machine and carrying a cam roller 308 operated by a cam 309 on the main drive shaft 15. When roller 308 reaches the low part of the cam, springs 305 move slide 300 to the left and the cams 301 and 302 cam the open one of the shutters 275 and 288 back to normal. Cam 301 rocks cam 283 clockwise and the upper edge of cam 283 engages stud 287 to restore shutter 288. Cam 302 acts directly on roller 304 on shutter 275.

The automatic signal may be disabled by means of a lever 310 (Fig. 1) having a lug 311 on it (Fig. 7) for holding it in raised ineffective position. This lug can be brought into register with a slot in the plate 26 so that the lever can be moved down until a plunger on it enters the openings 312 (Fig. 15) in the link 263 and an extension of the bell crank lever 254. When the lever is so moved it locks the parts 263—254 against movement by the springs 258 and 268 that tend to actuate them. Movement of slide 300 is prevented by turning a locking pawl 313 (Fig. 6) into engagement with a notch 314 in a collar on the stationary shaft 307.

Operation

While the operation of the machine should be clear from the description already given, it will be further explained by following through a typical operation.

The machine is started by moving the lever 21 from the "stop" to the "start" position where it is momentarily held. This engages the clutch which causes the main drive shaft to be rotated after which the lever is moved to the "run" position so that cam 22 on slide 20 will free the stud 18 to permit the automatic stop mechanism to operate when occasion requires.

The collars 10 are placed by hand in the openings 30 in the carrier plate 27 which automatically moves them to measuring position.

As a collar reaches its A measuring position the cam 101 (Fig. 8) releases the rock lever 96 and the slide 92 carrying the micrometer mechanism moves downward quickly until it limits on the stud 103. The micrometer shaft 80 engages the collar lightly at A and the spiral cams 120 and 121 are separated.

Immediately after this occurs the cam 141 (Fig. 6) releases the slide 138 with its link 135, the link moving to the right in Figs. 6 and 5 to rock the shaft 127 counterclockwise as viewed in Fig. 11. This releases the gear 126 and it, in turn, releases the shaft 86 which is then turned clockwise by spring drum 83 until the cam 121 engages cam 120 as shown in Fig. 10, the micrometer shaft 80 being thereby forced into measuring engagement with the collar 10 at the point A. Rotation of the micrometer shaft 80 positions the broad lug 151 either on, short of, or beyond a central position with relation to the arms 160, 161, 162 and 163 (Fig. 13).

Immediately thereafter the slide 181 (Fig. 5) is released by cam 186 for movement to the left as viewed in Fig. 5 which releases all the arms 160, 161, 162 and 163 (Figs. 12 and 13) for movement under the action of the various springs tending to move them. If the collar is perfect, none of the arms can move because lug 151 will block all of them. If the collar is plus or minus within certain limits the arm 161 or the arm 163 can move and corresponding pin 204 will be set in accordance with whether the collar is plus or minus.

Assuming that the machine is not stopped, the cam 101 (Fig. 8) now pushes plunger 99 downward and rocks lever 96 to raise the slide 92 to quickly raise the micrometer shaft out of engagement with the surface A of the collar. The cam 186 (Fig. 6) passes roller 185 thereby allowing lever 184 to be rocked counterclockwise by the action of spring 183 (Fig. 5) which pulls the slide 181 to the right to cause cam rollers 180 and 182 to rock the moved arm 161 or 163 back to normal. The cam 141 (Fig. 6) pushes slide 138 with its stud 136 and link 135 to the left thereby rocking shaft 127 (Fig. 11) clockwise to retension the spring drum 83 and to rotate the micrometer shaft back to its normal position.

The cam 41 (Fig. 6) acting on roller 40 rocks lever 38 clockwise and pushes slide 34 to the left. Referring to Fig. 4, this slide actuates the feeding or escapement mechanism for the carrier disk 27. The parts are coordinated so that the feeding movement in the above described operation is only one short step, that is, just enough to move the collar 10 from its first to its second measuring position.

The above operations are then repeated except that, in the meantime, and before the micrometer shaft 80 is lowered, the cam 112 (Fig. 8) rocks lever 108 counterclockwise to pull the limit stud 104 into position so that, when the side 92 is lowered, the latter will be arrested by stud 104 instead of stud 103. This automatically positions the parts to measure the surface B of collar 10.

After measurement at B the operation is again repeated, the carrier disk 27 being moved a short distance to move the collar 10 to its third or C measuring position and the limit stud 103 being moved back to active position so that the micrometer parts will be properly positioned to measure the collar at C.

After the measurement at C the next stroke of slide 34 actuates the feeding mechanism for carrier disk 27 through one its larger strokes of movement which moves the measured collar out of measuring position and moves a new collar to the A measuring position.

The measured collar is then moved around to the discharge stations as the machine continues to operate. The first large step of the carrier disk 27 does not move the measured collar over one of the trap doors, there being one or more blank positions between the measuring position of the collar and the first discharge station.

When the collar reaches the first discharge position, which is the "plus" station, the trap door at that station is opened if the pin 204 that was set in measuring the collar is in its "plus" position, but if said pin is in its "minus" or its "perfect" position, the trap door remains closed and the collar is not discharged. Instead, upon the next movement of disk 27, the collar is moved on toward the "minus" station.

When and if the collar reaches the "minus" station, the trap door at that station is opened if the pin 204 for the collar is set in its "minus" position, in which event the collar is automatically discharged. The door at the "minus" station is also opened if the pin 204 is in its "plus" position, but this is immaterial as the "plus" door which is ahead of the "minus" door, would have been opened and the collar would have been discharged at the "plus" station. If pin 204 is in its "perfect" position the "minus" door remains closed and the collar moves on toward the "perfect" station as the disk 27 is stepped around.

When and if the collar reaches the "perfect" position it drops through the opening into the chute located beneath said opening.

If the collar should be oversize or undersize more than the desired limit, one of the arms 160 or 162 will be free to move when the arms 160, 161, 162 and 163 are released by movement of slide 181 (Fig. 5). Upon movement of either of these arms 160 or 162 the machine is automatically stopped and a signal displayed indicating that the article is oversize or undersize. Incidentally, one of the arms 161 or 163 will also be free for movement and will move to set the corresponding pin 204, but the setting of this pin has no effect because the collar 10 will not be in the carrier disk 27 when the latter reaches a position where the pin 204 will act on the trap doors.

When the machine is stopped the operator should remove the collar by hand and, in order to do this, he must start the machine again so that the collar will be moved away from measuring position to a position where it can be readily grasped, such position being short of the discharge stations. The operator moves lever 21 to the "start" position which starts the machine even though the automatic stopping mechanism is in position to stop it, owing to the fact that cam slot 19 positively holds the slide 17 down to engage the clutch. As soon as the machine starts the automatic stop mechanism is restored after which the operator moves lever 21 to "run" position so that the stop mechanism will be operative for the next measurement.

As previously explained the pin 204 for a given collar is settable in all three measuring positions of the collar. This means that it is automatically discharged or the machine is stopped if any one of the dimensions varies beyond the required limits. If the dimensions at A and B are perfect, but the dimension C is plus or minus the collar will be discharged at the appropriate station, or the machine stopped if the dimension C is oversize or undersize more than .0005". If the dimension A is perfect but B is plus or minus the collar will be discharged at the appropriate station, or the machine stopped if dimension B is over or undersize more than .0002". This means that the sorted "plus" articles may be plus at B or at C and the sorted "minus" articles may be minus at B or C. Also, if the measurement at A is plus, the pin 204 will not be controlled by subsequent minus dimensions at B or C. This offers no disadvantages in the case of the collars 10 because the dimensions at A and C, if they vary at all, usually vary more than .0005" with the result that the machine is stopped and the collar discarded. The dimension of primary interest is that at B and the actual selection in practice is "plus" or "minus" collars which are plus or minus at B, the machine being stopped if the dimensions at A or C are off. This embodiment of the invention has been chosen to illustrate the automatic stopping feature as well as the selective sorting. If greater selectivity is desired, the number of discharge stations is increased and more pins 204 are provided. For example, if separate selectivity for all three dimensions of collar 10 were desired, a set of three pins 204 would be provided for each collar position 30 in disk 27. One of these pins would be set by measurements at A, another by measurements at B, and the third by measurements at C. These pins would then control six discharge stations, that is, a "plus" and a "minus" station for each pin.

In use the machine is not only extremely fast, but it is very accurate. Each article is held in the same position so that the micrometer shaft engages the articles at the same points. By automatically maintaining the tension of the micrometer driving spring constant, and by moving the micrometer shaft down to where very little turning movement is required to effect the measurement, a very uniform engagement of the micrometer shaft with the article can be obtained. This engagement is the same for different dimensions because the control of the rapid positioning of the micrometer shaft is automatic and in accordance with the dimension to be measured. It is not necessary to stop to read the micrometer in order to determine whether the article is of the proper size. If it is perfect, or if it is within the desired limits but slightly plus or minus, it is discharged into the proper receptacle while, if it is a "reject", the machine is automatically stopped and the operator is notified whether the "reject" is oversize or undersize. If it is undersize the article can be thrown away. If it is oversize it can be sent back to be cut down to the proper size.

The machine can be easily adjusted to take care of different kinds of articles; the automatic stopping and the automatic signal feature can be eliminated if desired; the step by step feed of the carrier plate can be varied to suit the number of measurements required on each article; and the fineness of measurement can be adjusted to suit the requirements, it being possible to make very fine adjustments owing to the magnified movement of the periphery of the disk on the micrometer shaft.

It is to be understood that the structure shown is for purposes of illustration only and that variations may be made in it without departing from the spirit and scope of the invention as defined by the appended claims.

I claim:

1. An automatic micrometer having means for holding an article in measuring position, a micrometer measuring means including a rotatable head that is automatically advanced as it is rotated, mechanism acting to automatically turn said micrometer measuring head into measuring engagement with an article with a uniform degree of force for each measuring operation, and means indicating the size of the article as measured by said measuring means.

2. An automatic micrometer having means for holding an article in position to be measured, a rotatable micrometer measuring shaft that is automatically advanced as it is rotated, spring operated mechanism acting to rotate said shaft into micrometric measuring engagement with an article with a uniform degree of force for each measuring operation, and means indicating the size of said article as measured by said shaft.

3. An automatic micrometer having means for holding an article in measuring position, a rotatable micrometer measuring shaft that is automatically advanced as it is rotated, spring operated mechanism acting to automatically turn said shaft into micrometric measuring engagement with an article that is in measuring position, and means automatically retensioning said spring after each measuring operation of said shaft.

4. An automatic micrometer having means for holding an article in measuring position, a rotatable micrometer measuring shaft, spring operated mechanism acting to automatically rotate said shaft into micrometric measuring engagement with an article that is in measuring position, and means automatically retensioning said spring after each measuring operation in direct proportion to the measuring movement imparted to said shaft during the measuring operation.

5. An automatic micrometer having means for holding an article in measuring position, a rotatable micrometer shaft, spring operated mechanism acting to automatically rotate said shaft into micrometric measuring engagement with an article that is in measuring position, retensioning means having a fixed path of movement, and means acting to automatically connect said spring operated mechanism to said retensioning means at points in the movement of the latter proportional to the movement imparted to said measuring shaft during measuring operations.

6. An automatic micrometer having means for holding an article in measuring position, a slidably mounted micrometer shaft, means acting to automatically slide said shaft into engagement with an article to be measured, a cam slidable with said shaft, means arresting said cam in a predetermined position relative to said article, a cam rotatable with said shaft, and means acting automatically to cause relative rotative movement between said cams to thereby force said micrometer shaft into micrometric measuring engagement with said article, the relative rotation of said cams being proportional to the dimensions of said article.

7. An automatic micrometer having means for holding an article in measuring position, a slidably and rotatably mounted micrometer shaft, means acting to automatically slide said shaft into engagement with an article to be measured, a cam slidable with said shaft, means arresting said cam in a predetermined position relative to said article, a cam rotatable with said shaft and adapted to engage said first mentioned cam, and means acting to automatically rotate said shaft to cause engagement of said cam to force said micrometer shaft into micrometric measuring engagement with said article.

8. An automatic micrometer for measuring different dimensions of an article comprising means for holding an article in measuring position, a micrometer measuring means, means acting to automatically and rapidly move said measuring means toward the surfaces of said article to be measured, means for successively arresting said measuring means in a plurality of predetermined positions relative to the article to be measured, and mechanism for subsequently bringing said micrometric measuring means into measuring engagement with said surfaces.

9. An automatic micrometer for measuring different dimensions of an article comprising means for holding articles in measuring position, a micrometer measuring means including a micrometer shaft, means acting to automatically and rapidly give said measuring means successive movements toward the surfaces of said article to be measured, means automatically arresting said measuring means in predetermined relation to each of the different surfaces to be measured, and means acting to automatically move said micrometer shaft into micrometric measuring engagement with the respective surface to be measured after each arrest of said measuring means.

10. An automatic micrometer for measuring different dimensions of an article comprising means for holding articles in measuring positions, a slidably and rotatably mounted micrometer measuring means including a micrometer shaft, means acting to automatically slide said measuring means toward each surface of said article to be measured, means acting to automatically arrest said measuring means in predetermined relation to each of the different surfaces, and means acting to automatically rotate said micrometer shaft into micrometric measuring engagement with said surfaces after the measuring means is arrested.

11. An automatic micrometer for measuring different dimensions of an article comprising means for holding an article in different measuring positions, a slidably and rotatably mounted micrometer measuring means including a rotatable micrometer shaft, means acting to automatically slide said measuring means toward each surface to be measured as said surface is brought to measuring position, limit stops for arresting said measuring means in predetermined relation to the surfaces to be measured, means automatically and selectively moving said stops to arresting position in accordance with the surface to be measured, and mechanism acting to automatically rotate said micrometer shaft into micrometric measuring engagement with said surfaces after the measuring means is arrested.

12. An automatic micrometer for measuring different dimensions of an article comprising means for holding articles in different measuring positions, a slidably and rotatably mounted micrometer measuring shaft, means for sliding said shaft toward a surface to be measured, a cam slidable with said shaft, stops for limiting said cam in predetermined positions relative to each surface to be measured, means for automatically moving said stops to arresting position in accordance with the dimensions of the surface to be measured, a second cam rotatable with said shaft, and mechanism for automatically rotating said shaft to cause said cams to engage to thereby force said shaft into measuring engagement with said surfaces.

13. An automatic micrometer for measuring different dimensions of an article comprising means for holding articles in different measuring positions, a slidably and rotatably mounted measuring means, means acting to automatically slide said measuring means toward a surface to be measured as said surface is brought to measuring positions, means arresting said measuring means in predetermined position relative to each of the surfaces to be measured, spring operated mechanism for rotating said measuring means into measuring engagement with said surfaces after the measuring means is arrested, and means acting to automatically retension said spring means after each measuring operation in accordance with the rotation imparted to said measuring means during said measuring operation.

14. An automatic micrometer for measuring different dimensions of an article comprising an endless carrier for receiving said article, means for moving said carrier to move the article to an initial measuring position, means for subsequently moving said carrier to move said article to different measuring positions, a micrometer measuring means including a rotatable head that is automatically advanced as it is turned, and means acting to automatically turn said micrometric measuring head into measuring engagement with the different surfaces of said articles as they are moved to different measuring positions.

15. An automatic micrometer for measuring different dimensions of an article comprising an endless carrier for receiving articles, a step by step mechanism for moving said carrier through a large step to move an article to an initial measuring position and to subsequently move it through small steps of movement to move said article to different measuring positions, a micrometer measuring means, and mechanism acting to automatically bring said micrometer measuring means into micrometric measuring engagement with the surfaces of said articles as they are brought to different measuring positions.

16. An automatic micrometer having means for moving an article from measuring position toward discharge stations, a mocrometer measuring means automatically brought into micrometric measuring engagement with said article while it is in measuring position, said measuring means including a rotatable shaft that is automatically advanced as it is turned, and means controlled by said micrometer measuring shaft acting to automatically discharge said article at a selected discharge station in accordance with the size of the article as measured by said rotatable measuring shaft.

17. An automatic micrometer having means for moving articles from measuring position toward discharge positions, a micrometer shaft rotatable into micrometric measuring engagement with an article when it is in measuring position, and means carried by said article moving means set under the control of said micrometer shaft acting to cause each measured article to be automatically discharged at an appropriate station corresponding to the size of the article as measured by said shaft.

18. An automatic micrometer having an endless carrier for moving an article from measuring position toward a plurality of discharge stations, a micrometer shaft automatically moved into micrometric measuring engagement with said article while the latter is in measuring position, and means on said carrier and movable therewith set under the control of said micrometer shaft while said article is being measured acting to subsequently cause said article to be automatically discharged at the appropriate station corresponding to the size of the article as measured by said shaft.

19. An automatic micrometer having a carrier disk for moving an article from measuring position toward discharge stations, means for automatically moving said disk, a micrometer measuring means automatically rotated into measuring engagement with an article while it is in measuring position, and means on said disk set by said measuring means and acting to automatically discharge said article at a selected station corresponding to the size of the article as measured by said measuring means.

20. An automatic micrometer having means for moving articles from a measuring position toward discharge stations, a rotatable micrometer shaft, mechanism for rotating said shaft into measuring engagement with an article when it is in measuring position, a plurality of arms movable toward said shaft, a disk on said shaft having stops on its periphery adapted to obstruct said arms in accordance with the position of the disk as determined by rotation of said shaft, and means controlled by said arms acting to cause a measured article to be automatically discharged at a station corresponding to the size of the article as measured by the micrometer shaft.

21. In an automatic micrometer having a carrier disk for moving articles from measuring position toward discharge stations, a micrometer shaft, mechanism for rotating said shaft into measuring engagement with an article when the latter is in measuring position, a plurality of arms automatically moved toward said shaft at each operation of the machine, a disk on said shaft carrying stops adapted to obstruct said arms, and means controlled by said arms for setting devices on said carrier disk, said devices acting to cause said articles to be automatically discharged at appropriate stations corresponding to the size of the articles.

22. An automatic micrometer having means for moving articles from measuring position toward discharge stations, a micrometer measuring means including a measuring element, mechanism acting to automatically and successively bring said element into measuring engagement with different surfaces on said articles while they are in measuring positions to measure different dimensions of said article, and means controlled by said measuring means acting to automatically discharge said articles at the appropriate stations in accordance with the size of the articles as measured at their different surfaces.

23. An automatic micrometer having means for moving articles to different measuring positions and for subsequently moving them to discharge stations, a rotatable micrometer shaft means for automatically and successively rotating said shaft into measuring engagement with different surfaces on said articles, and means set under the control of said rotatable shaft acting to automatically discharge said articles at stations corresponding to the size of the articles as measured on their different surfaces by said micrometer shaft.

24. An automatic micrometer having a plurality of discharge stations, a trap door at each discharge station, a measuring station for all of said discharge stations means for moving articles from said measuring station over the trap doors of said discharge stations, micrometer measuring means automatically brought into measuring engagement with an article when it is in measuring position, and means set under the control of said measuring means acting subsequently to automatically open the trap door of a selected station when a measured article reaches said station.

25. An automatic micrometer having means for moving articles from a measuring position over trap doors located at different discharge stations, a rotatable micrometer shaft, means automatically rotating said shaft into measuring engagement with an article when the latter is in measuring position, and means controlled by the position of said micrometer shaft when it is in measuring engagement with an article acting to automatically and selectively open a trap door for said article when the latter reaches its appropriate discharge station.

26. An automatic micrometer having means for moving an article to several measuring positions and for moving it from its last measuring position toward discharge stations, a micrometer measuring means including a measuring element, mechanism acting to automatically and successively bring said element into measuring engagement with the article in its several measuring positions, and means set by said measuring means in its measuring action in the several measuring positions of the article acting to discharge said article at appropriate stations in accordance with the accuracy of the dimensions of said article at the several surfaces.

27. An automatic micrometer having a power actuated operating means, means for holding an article in measuring position, a micrometer measuring means, mechanism acting to automatically move said measuring means into micrometric engagement with said article when the latter is in measuring position, means for moving said article from measuring position to different discharge stations, means controlled by said measuring means for causing said article to be discharged at a station selected in accordance with the variation of said article by predetermined amounts in either direction from a given dimension, and means controlled by said measuring means acting to automatically stop said operating means when the article being measured varies more than a predetermined amount from a given dimension.

28. An automatic micrometer having a power actuated operating means, means for holding an article in different measuring positions, a micrometer measuring means, mechanism acting to automatically move said measuring means into measuring engagement with different surfaces on an article when the latter is in its measuring positions, and means controlled by said measuring means acting to automatically stop said operating means when any of said surfaces vary more than a predetermined amount from given dimensions.

29. An automatic micrometer having means for holding an article in measuring position, a micrometer measuring means including a rotatable head that is automatically advanced as it is rotated, mechanism acting to automatically turn said measuring head into measuring engagement with an article, and means controlled by said measuring head acting automatically to display a signal when said article varies more than a predetermined amount from a given dimension.

30. An automatic micrometer having means for holding an article in measuring position, a a micrometer measuring means including a rotatable head that is automatically advanced as it is turned, mechanism acting to automatically turn said micrometric measuring head into measuring engagement with an article, means for moving said article from measuring position to different discharge stations, means controlled by said measuring means for discharging said articles at different stations in accordance with their variations by predetermined amounts in either direction from a given dimension, and signal means acting to automatically display a signal when the article varies more than a predetermined amount from a given dimension, indicating whether said article is over or under said dimension.

31. An automatic micrometer having a power actuated operating means, means for holding an article in measuring position, a micrometer measuring means including a rotatable head that is automatically advanced as it is turned, mechanism acting to automatically turn said measuring head into measuring engagement with an article, means controlled by said micrometer measuring means acting to automatically stop said operating means when the article being measured varies more than a predetermined amount from a given dimension, and means acting to automatically display a signal indicating whether said article is above or below said given dimension.

32. An automatic micrometer having a movable carrier for receiving articles to be measured and for moving them to and from measuring position, means for intermittently moving said carrier, a micrometer measuring shaft that is automatically advanced as it is rotated, power driven means acting to automatically turn said shaft into micrometric measuring engagement with an article each time an article is moved by said carrier to measuring position, and means indicating the size of said article as measured by said shaft.

33. A power driven micrometer having means for receiving and holding an article in measuring position, a micrometer measuring means normally in position to be moved into engagement with said article but separated a substantial distance therefrom, means operable to rapidly move said measuring means toward said article, means for arresting said measuring means before it reaches measuring engagement with said article, and power driven means operable to give said measuring means another movement into micrometric measuring engagement with said surface.

34. A power driven micrometer having means for receiving and holding an article in measuring position, a micrometer measuring shaft slidable toward said article and also rotatable in a manner to be automatically advanced as it is rotated, said shaft being normally in position to be slid toward the article to be measured, means operable after said article is in measuring position to rapidly slide said measuring shaft bodily toward the article to be measured and to an approximate measuring position, and power driven means operable after said shaft has been moved to approximate measuring position to rotate said shaft into micrometric measuring engagement with said article.

35. An automatic micrometer having means for receiving and holding an article in measuring position, a micrometer measuring means movable bodily toward an article to be measured, said measuring means including a rotatable micrometer shaft that is automatically advanced when it is rotated, means acting automatically after an article is in measuring position to rapidly move said measuring means toward the surface of the article to be measured, means for arresting said measuring means in a predetermined position relative to said surface, and mechanism acting automatically after said measuring means has been arrested to turn said micrometer measuring shaft into micrometric measuring engagement with said article.

36. An automatic micrometer having means for receiving and holding an article in measuring position, a slidably mounted micrometer measuring shaft, means acting to automatically slide said shaft to a predetermined position relative to said article, means for arresting said shaft, and rotatable means acting to automatically force said shaft into micrometric measuring engagement with said article after said shaft has been arrested, the rotation of said rotatable means being a measure of the dimension of said article.

37. An automatic micrometer having means for receiving and holding an article in measuring position, a micrometer measuring shaft which is slidable bodily and which is also rotatable in a manner to be automatically advanced as it is rotated, means acting automatically after said article is in measuring position to slide said shaft to an approximate measuring position relative to said article, and mechanism acting automatically after said shaft has been slid to said position to rotate said shaft into micrometric measuring engagement with said article.

38. An automatic micrometer for measuring different dimensions of an article comprising means for receiving and holding an article in measuring position, a micrometer measuring means, and power driven means acting to automatically and successively move said measuring means into micrometric measuring engagement with the different surfaces of the article to be measured while said article is in measuring position.

39. An automatic micrometer for measuring different dimensions of an article comprising means for receiving and holding an article to be measured, means acting automatically after a given dimension has been measured, to move said article to a different measuring position, a micrometer measuring means, and means acting automatically each time said article occupies a different measuring position to move said measuring means into micrometric measuring engagement with the surface of said article that is in measuring position.

40. An automatic micrometer for measuring different dimensions of an article, comprising means for receiving and holding an article to be measured, means acting automatically, after said article has been received, to move said article to an initial measuring position, said moving means also acting automatically to subsequently move said article successively to other measuring positions, a micrometer measuring means, and means acting automatically each time said article occupies a different measuring position to move said measuring means into micrometric measuring engagement with the surface of said article that is in measuring position.

41. An automatic micrometer having means for holding an article in measuring position, a micrometer measuring means including a measuring head, mechanism acting to automatically move and yieldingly press said head into micrometer measuring engagement with an article to be measured with a uniform degree of force for each measuring operation, and means acting automatically to reset said moving means after each measuring operation to produce the same degree of force of the head against said article in the next succeeding measuring operation.

ARTHUR R. LAFFERTY.
ANTHONY S. MARTA.